United States Patent
Mochizuki et al.

(10) Patent No.: US 9,495,871 B2
(45) Date of Patent: Nov. 15, 2016

(54) DISPLAY CONTROL DEVICE, DISPLAY CONTROL METHOD, NON-TRANSITORY RECORDING MEDIUM, AND PROJECTION DEVICE

(71) Applicant: Panasonic Intellectual Property Management Co., Ltd., Osaka (JP)

(72) Inventors: Makoto Mochizuki, Kanagawa (JP); Koichi Emura, Kanagawa (JP); Eriko Ohdachi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 14/693,905

(22) Filed: Apr. 23, 2015

(65) Prior Publication Data
US 2015/0325125 A1 Nov. 12, 2015

(30) Foreign Application Priority Data

May 7, 2014 (JP) .................................. 2014-095864
Jan. 13, 2015 (JP) .................................. 2015-003816

(51) Int. Cl.
*G08G 1/09* (2006.01)
*G08G 1/0967* (2006.01)
(Continued)

(52) U.S. Cl.
CPC ......... *G08G 1/096783* (2013.01); *B60K 35/00* (2013.01); *G08G 1/0962* (2013.01); *G08G 1/09626* (2013.01); *B60K 2350/1056* (2013.01)

(58) Field of Classification Search
CPC .................... G08G 1/096783; G08G 1/0962; G08G 1/09626; B60K 35/00; B60K 2350/1056
USPC ...................... 340/905, 441, 425.5, 901, 438
See application file for complete search history.

(56) References Cited

U.S. PATENT DOCUMENTS 5,844,505 A * 12/1998 Van Ryzin ......... G01C 21/3602
340/905
6,266,589 B1 * 7/2001 Boies ....................... B60Q 9/00
701/1
(Continued)

FOREIGN PATENT DOCUMENTS

| JP | 2004-347470 | 12/2004 |
| JP | 2009-187166 | 8/2009 |
| JP | 2012-224247 | 11/2012 |

OTHER PUBLICATIONS

The Extended European Search Report (EESR) from European Patent Office (EPO) dated Oct. 20, 2015 in European Patent Application No. 15164462.2.

*Primary Examiner* — Jack K Wang
(74) *Attorney, Agent, or Firm* — Greenblum & Bernstein, P.L.C.

(57) ABSTRACT

A display control device causes a display unit to generate a first predetermined image representing a first presentation image that indicates a first speed limit. Change in a speed limit of a road where a vehicle travels from a first speed limit to a second speed limit different from the first speed limit is recognized. When the recognized change in the speed limit indicates decrease, the first predetermined image is switched by a first switching method so that a second predetermined image representing a second presentation image that indicates the second speed limit is generated. When the recognized change in the speed limit indicates increase, the first predetermined image is switched by a second switching method different from the first switching method so that the second predetermined image is generated.

13 Claims, 14 Drawing Sheets

(51) Int. Cl.
*B60K 35/00* (2006.01)
*G08G 1/0962* (2006.01)
*B60Q 1/00* (2006.01)
*G08G 1/00* (2006.01)

(56) References Cited

U.S. PATENT DOCUMENTS

| | | | | |
|---|---|---|---|---|
| 6,388,578 B1 * | 5/2002 | Fagan | ............... | G08G 1/096716 340/901 |
| 6,462,675 B1 * | 10/2002 | Humphrey | ............. | G08G 1/052 340/441 |
| 6,472,977 B1 * | 10/2002 | Pochmuller | ............ | B60K 35/00 340/425.5 |
| 6,515,596 B2 * | 2/2003 | Awada | ............. | G08G 1/096716 340/901 |
| 6,778,074 B1 * | 8/2004 | Cuozzo | ................... | G01D 7/00 340/441 |
| 8,600,625 B2 * | 12/2013 | Imaeda | .................. | B60Q 1/525 701/49 |
| 8,977,486 B2 * | 3/2015 | Cho | ..................... | G08G 1/0969 701/409 |
| 2003/0052797 A1 * | 3/2003 | Rock | .................. | G01C 21/3697 340/936 |
| 2007/0001830 A1 * | 1/2007 | Dagci | ................. | B60K 31/185 340/438 |
| 2009/0195411 A1 | 8/2009 | Ichihashi et al. | | |
| 2009/0319129 A1 * | 12/2009 | Ghoneim | .............. | B60T 8/1755 701/42 |
| 2010/0207787 A1 * | 8/2010 | Catten | ............... | G06F 17/30241 340/905 |
| 2011/0288770 A1 * | 11/2011 | Greasby | ........... | G08G 1/096775 701/532 |
| 2013/0113633 A1 * | 5/2013 | Pilutti | .............. | G08G 1/096716 340/905 |

* cited by examiner

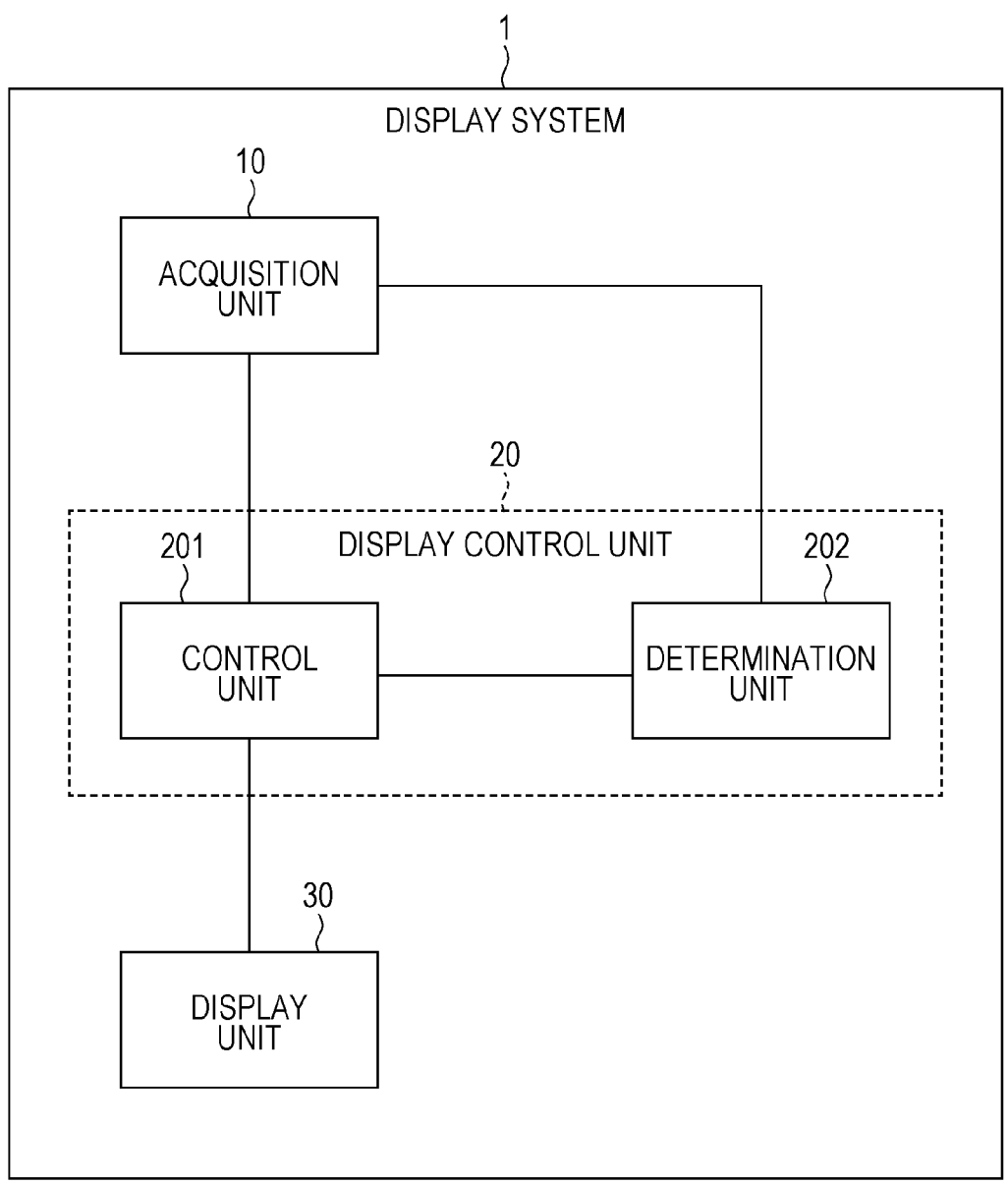

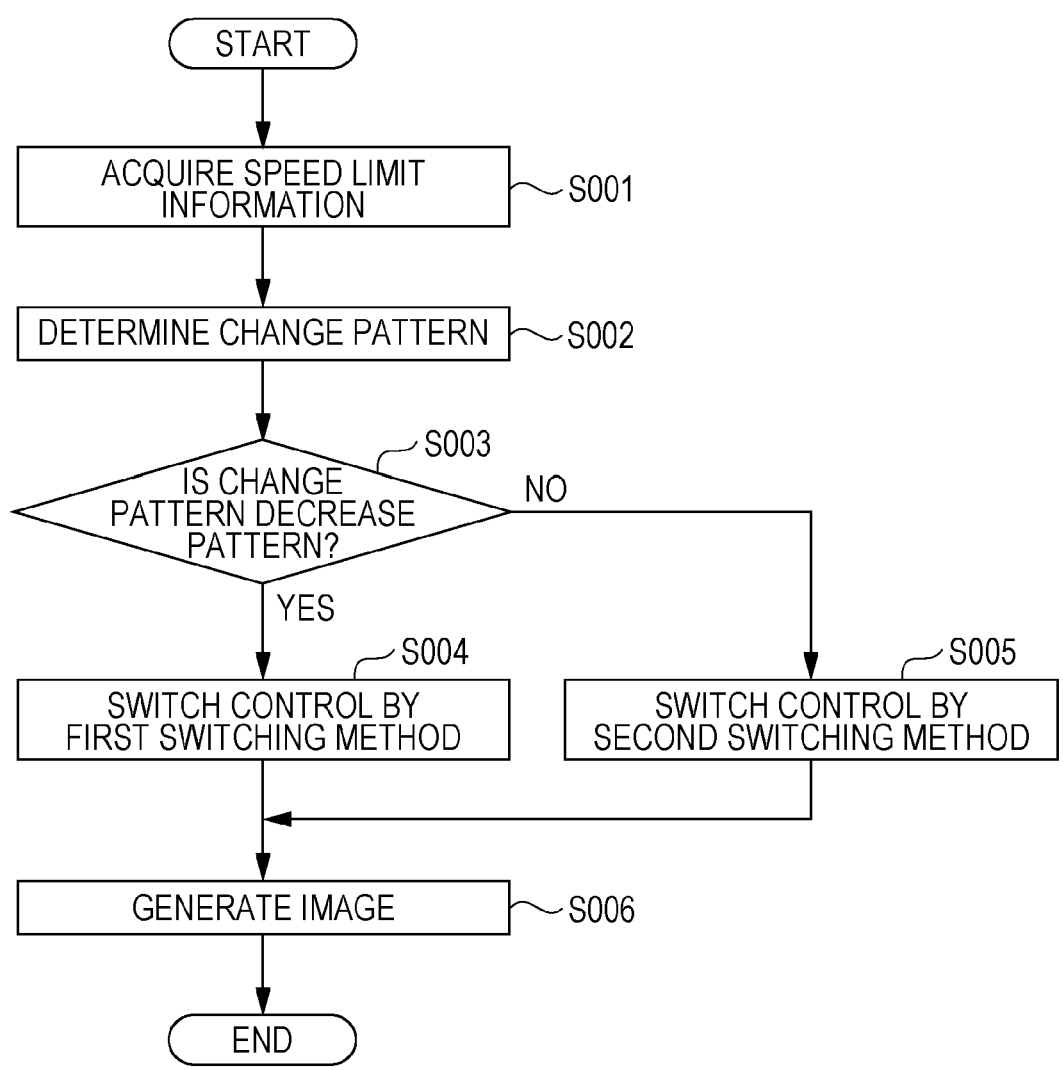

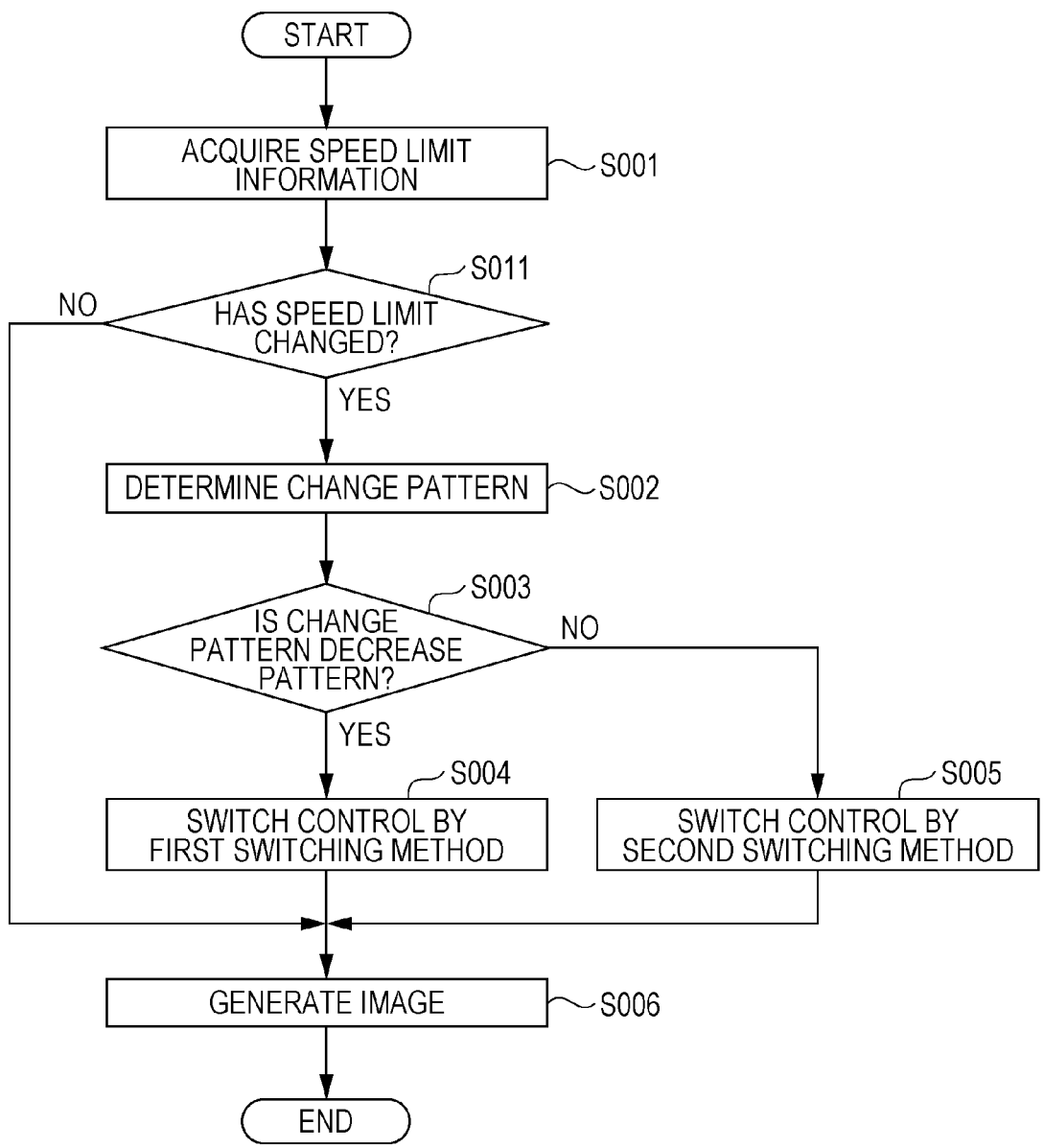

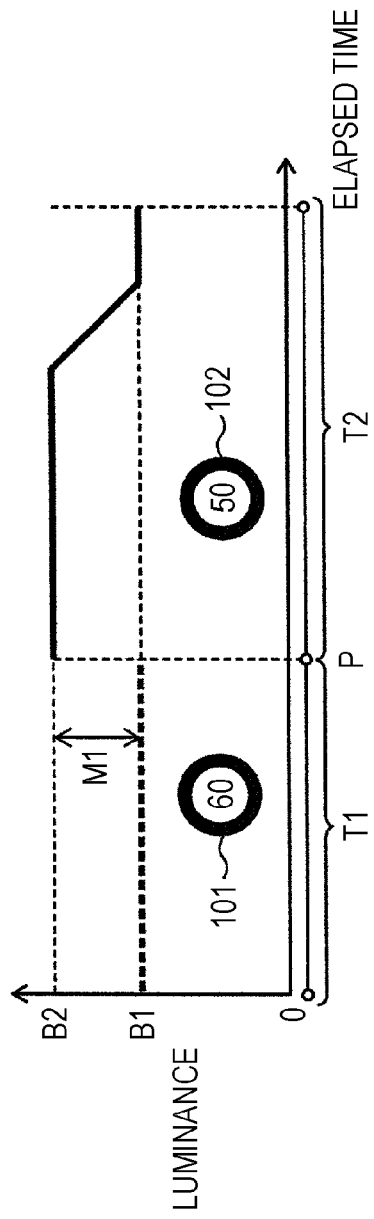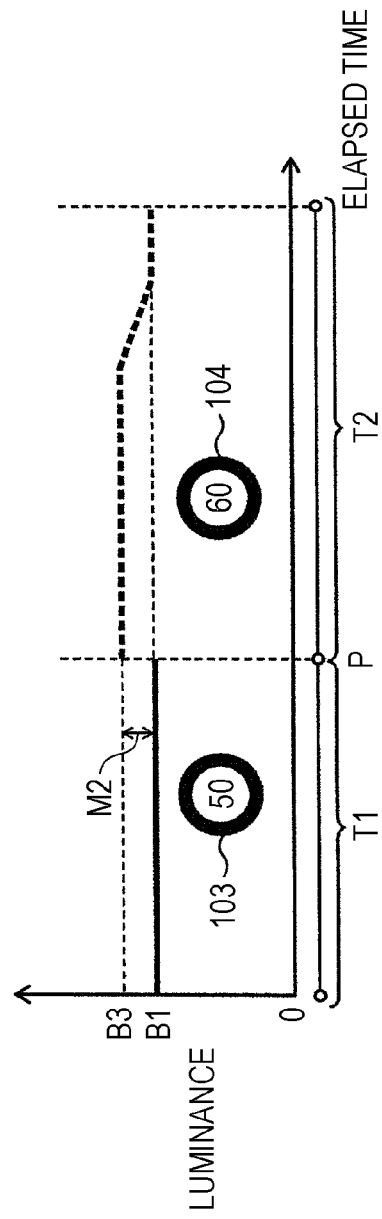

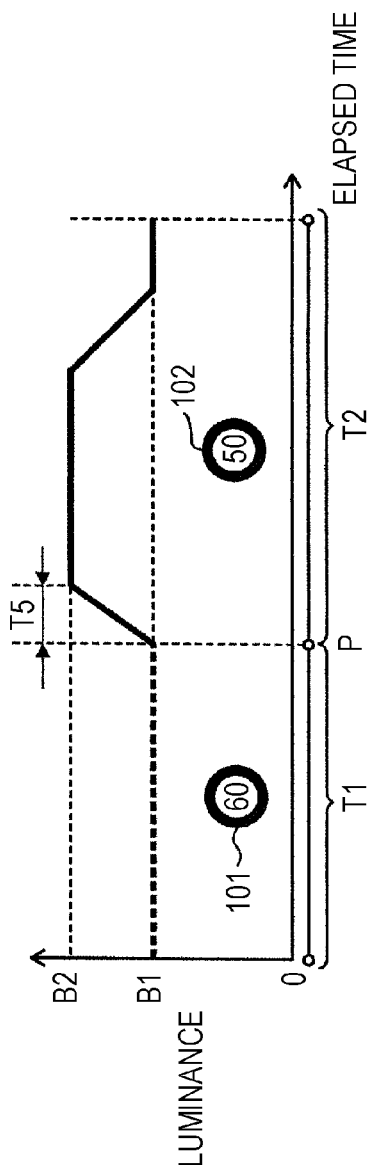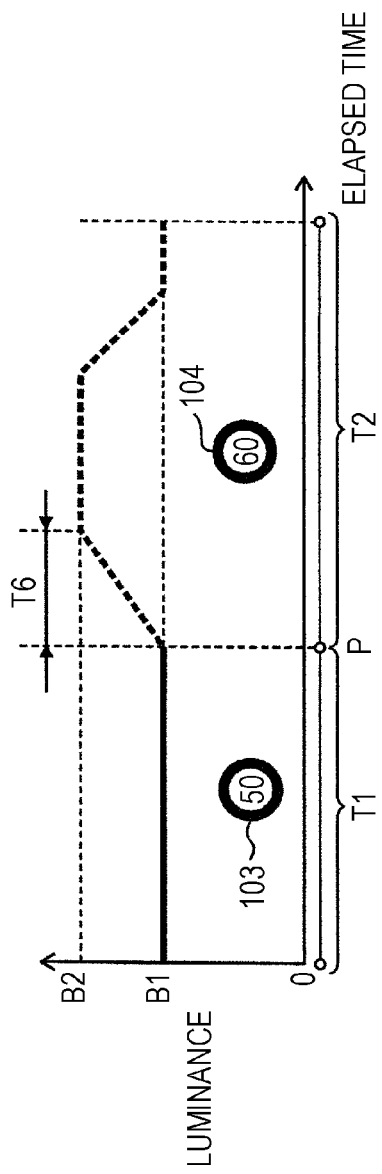

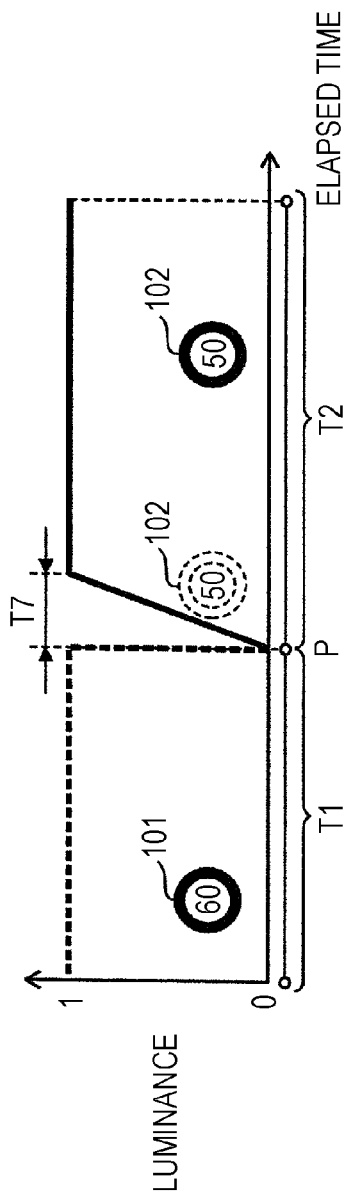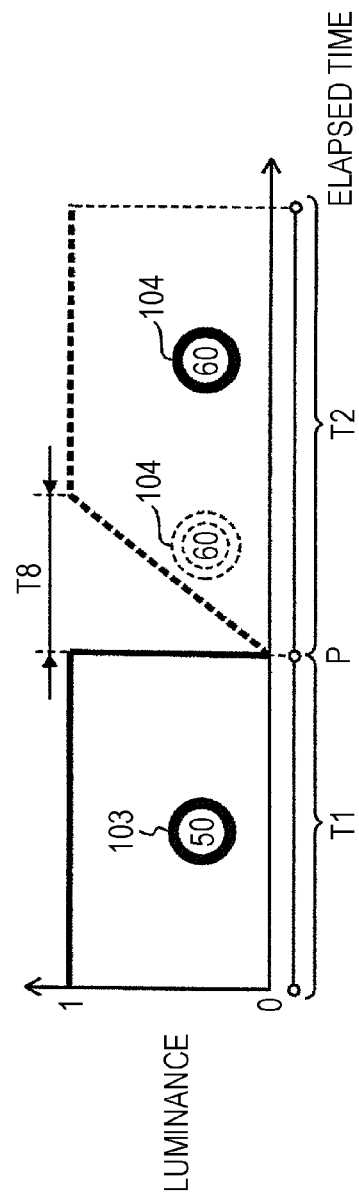

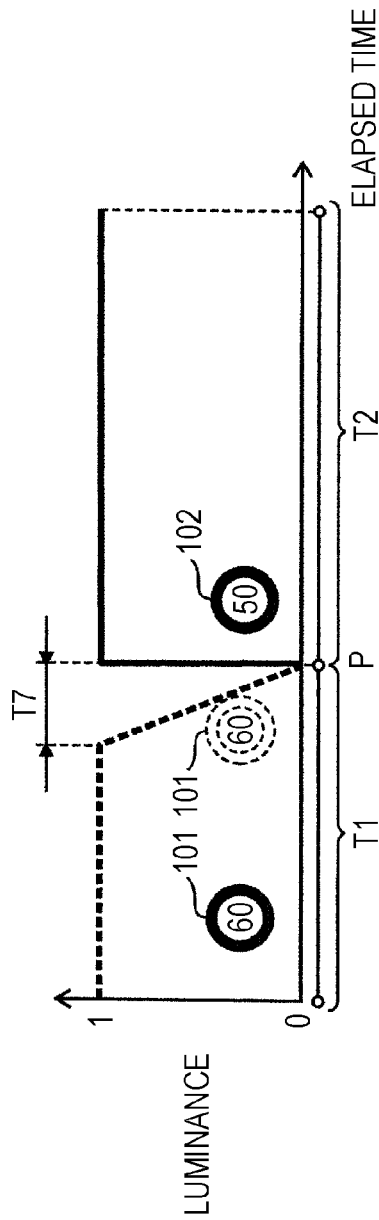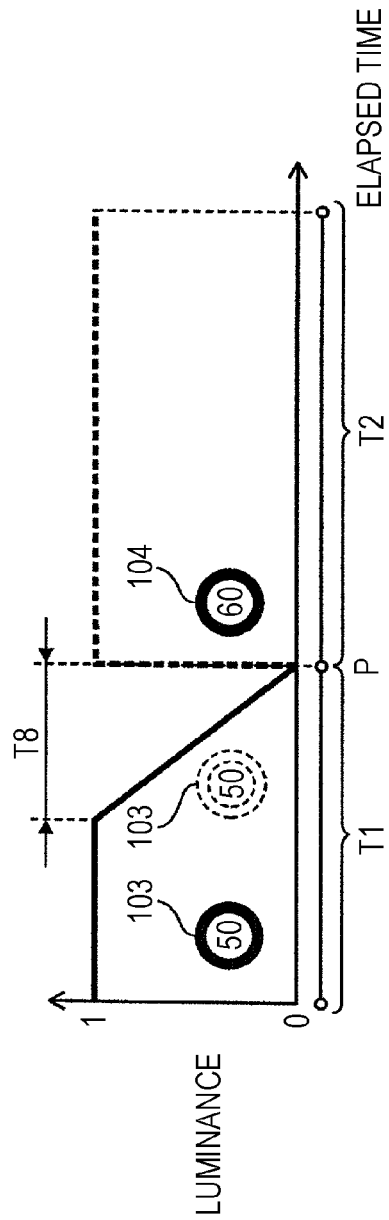

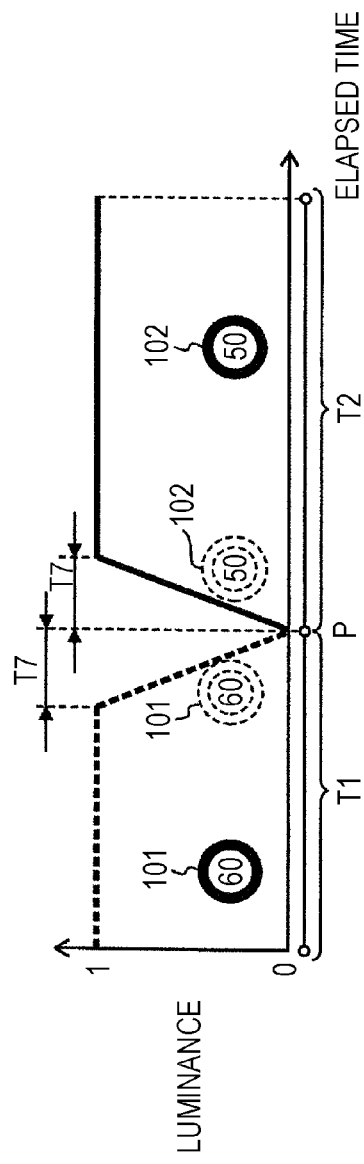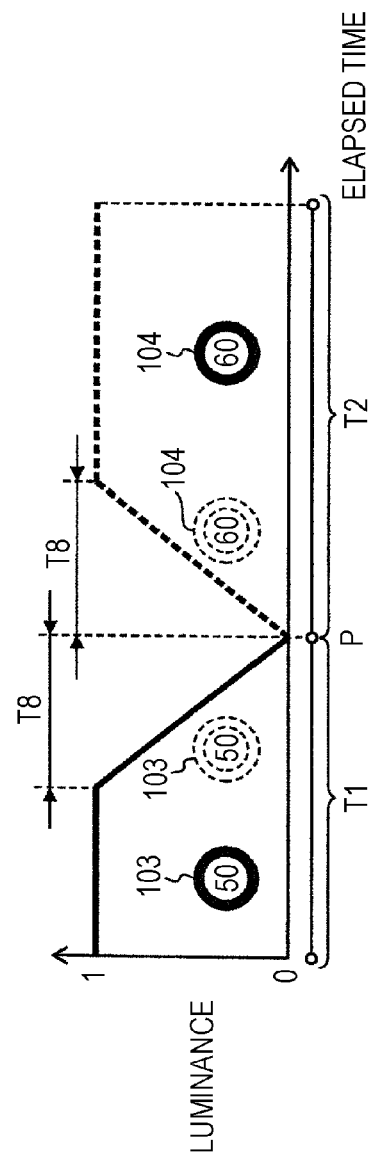

DISPLAY CONTROL DEVICE, DISPLAY CONTROL METHOD, NON-TRANSITORY RECORDING MEDIUM, AND PROJECTION DEVICE

BACKGROUND

1. Technical Field

The present disclosure relates to a display control device, a display control method, a non-transitory recording medium, and a projection device, which control display of information provided to an occupant of a vehicle or the like.

2. Description of the Related Art

Development of a drive support system that prevents overspeed by acquiring speed limit information of a road where a vehicle travels using an image, such as a traffic sign acquired by an in-vehicle camera, and conveying the acquired speed limit information to an occupant has been promoted in recent years. Such a drive support system is disclosed in for example, Japanese Unexamined Patent Application Publication No. 2009-187166, which is hereinafter referred to as the conventional art.

In the conventional art, the speed limit of a lane where a vehicle travels, which is hereinafter referred to as the travel lane, is identified and an image that indicates the identified speed limit is superimposed on a map image, and the resultant is displayed on a display medium. Further in the conventional art, the speed limit of an adjacent lane, which is a lane adjacent to the travel lane, is identified and an image that indicates the identified speed limit of the adjacent lane is superimposed on a map image, and the resultant is displayed on the display medium. Accordingly, the driver of the vehicle can be informed of the speed limit of each lane.

SUMMARY

However, the conventional art is undesirable in terms of visibility of speed limit information, which relates to the switch of an image that indicates the speed limit on a display medium.

One non-limiting and exemplary embodiment provides a display control device, a display control method, a non-transitory recording medium, and a projection device, which may enhance the visibility of the speed limit information displayed on a display medium.

In one general aspect, the techniques disclosed here feature a display control device including an input unit that receives speed limit information being information on a speed limit of a road where a vehicle travels, and a controller that controls a display generating a predetermined image based on the speed limit information and outputting the predetermined image to a display medium, where the predetermined image represents a presentation image that indicates the speed limit when displayed on the display medium, and the controller causes the display to generate a first predetermined image as the predetermined image representing a first presentation image that indicates a first speed limit, recognizes change in the speed limit from the first speed limit to a second speed limit different from the first speed limit according to the speed limit information, after recognizing the change in the speed limit, causes the display to generate a second predetermined image as the predetermined image representing a second presentation image that indicates the second speed limit and to switch display on the display medium from the first presentation image to the second presentation image, and when the recognized change in the speed limit indicates decrease, causes the display on the display medium to be switched by a first switching method, and when the recognized change in the speed limit indicates increase, causes the display on the display medium to be switched by a second switching method different from the first switching method.

It should be noted that general or specific embodiments may be implemented as a system, a method, an integrated circuit, a computer program, a storage medium, or any selective combination thereof.

According to an aspect of the present disclosure, visibility of the speed limit information displayed on a display medium may be enhanced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram that illustrates a configuration example of a display system according to embodiment 1 of the present disclosure;

FIG. 2 is a flowchart that illustrates an operation example of the display system according to embodiment 1 of the present disclosure;

FIG. 3 is a flowchart that illustrates an operation example of the display system according to embodiment 1 of the present disclosure;

FIGS. 5A and 5B are diagrams for explaining specific example 2 of the switch of the image display according to embodiment 1 of the present disclosure;

FIGS. 6A and 6B are diagrams for explaining specific example 3 of the switch of the image display according to embodiment 1 of the present disclosure;

FIGS. 7A and 7B are diagrams for explaining specific example 4 of the switch of the image display according to embodiment 1 of the present disclosure;

FIGS. 8A and 8B are diagrams for explaining specific example 5 of the switch of the image display according to embodiment 1 of the present disclosure;

FIGS. 9A and 9B are diagrams for explaining specific example 6 of the switch of the image display according to embodiment 1 of the present disclosure;

DETAILED DESCRIPTION

Figure 4A:
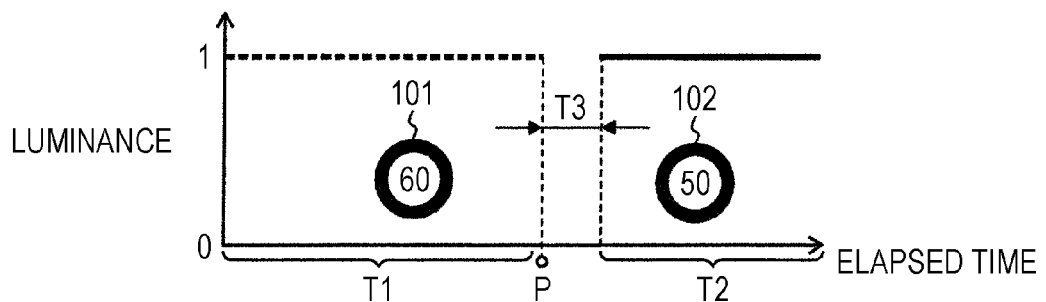
FIGS. 4A to 4C are diagrams for explaining specific example 1 of switch of image display according to embodiment 1 of the present disclosure.

In a conventional drive support system, speed limit information presented to an occupant on a display medium is changed uniformly when the speed limit of a road where a vehicle travels is switched. Thus, there are issues about visibility, such as a possibility that the occupant fails to notice the switch of the speed limit information when necessary or a possibility that the occupant feels visually hindered by the switch of the speed limit information when not particularly necessary. Embodiments 1 and 2 of the present disclosure described below address such issues to enhance the visibility of speed limit information displayed on a display medium.

Embodiment 1

Embodiment 1 of the present disclosure is described with reference to the drawings.

First, a configuration example of a display system 1 according to the present embodiment is described with reference to FIG. 1. FIG. 1 is a block diagram that illustrates the configuration example of the display system 1 according to the present embodiment.

For example, the display system 1 is used in a mobile unit, such as a vehicle, and supports the operation of the vehicle. The display system 1 may be an in-vehicle device or may be a device that is carried into the vehicle. In addition, although the present embodiment describes an example in which the user is an occupant of a vehicle and in particular describes an example in which the user is a driver of the vehicle, the user is not limited thereto. Further, the display system 1 may be used in a wearable computer, such as a head-mounted or helmet-mounted display (HMD) described below, which the user can wear on his or her body.

In FIG. 1, the display system 1 includes an acquisition unit 10, a display control device 20, and a display unit 30. The display control device 20 includes a control unit 201 and a determination unit 202.

The acquisition unit 10 acquires information on a speed limit of a road where a vehicle travels. Specifically, the acquisition unit 10 acquires speed limit information at a predetermined timing. The speed limit information is information that indicates the speed limit of the road, which is 30 km/h, 50 km/h, or the like. Examples of the road mentioned herein include a road of a predetermined section, a vehicular lane, and a road in an area for which a speed limit is predetermined.

It is assumed in the present embodiment, as an example, that the speed limit information is correlated with each road section included in map information in advance and is stored in a predetermined storage device together with the map information. The predetermined storage device may be provided in the display system 1 or may be provided outside the display system 1. For example, the acquisition unit 10 acquires the speed limit information from the predetermined storage device each time the road section where the vehicle travels is switched.

The display unit 30 generates a predetermined image based on the information acquired in the acquisition unit 10 and causes the predetermined image to be displayed on a display medium, which is not illustrated. Specifically, the display unit 30 generates an image based on control information of the control unit 201 and projects the generated image onto the display medium.

The predetermined image may be an image or may be image data. When the display unit 30 has a projecting function, the predetermined image is an image and the display unit 30 projects the predetermined image onto the display medium. When the display unit 30 has no projecting function, the display unit 30 generates image data and outputs the image data to the display medium.

When the display unit 30 has the projecting function, the display medium is for example, a head-up display (HUD). In this case, the display unit 30 projects the predetermined image onto the display medium and causes the occupant of the vehicle to recognize the predetermined image as a virtual image. Hereinafter, the present disclosure describes projecting the predetermined image onto the display medium and causing the occupant to recognize the predetermined image as a virtual image in the same meaning as displaying the predetermined image onto the display medium. That is, in the description below, it is explained as display that a predetermined image is projected onto a HUD and visually recognized by the occupant as a virtual image.

For example, the display unit 30 has a projecting function and directly projects the generated image onto the HUD, which is a display medium. As a result, the image is displayed on the HUD. The display unit 30 may cause the HUD to display the virtual image using the principle of a hologram for example, instead of using the projecting function. When a hologram is used, a scheme may be employed, which uses a light guide plate to guide light by performing total internal reflection on a group of parallel light beams satisfying conditions of the total internal reflection of the light guide plate. Although in the scheme using a light guide plate, image data is not projected directly unlike in a projector, the definition of the projection or display similar to the definition in the scheme using a projector is utilized in the description for convenience of explanation.

The display medium is not limited to the HUD. For example, a liquid crystal display (LCD), the HUD, an HMD, an eyeglass-type display (smart glasses), a navigation display, a meter display, or another special-purpose display is applicable to the display medium. The HUD may be for example, a windshield of a vehicle or may be a glass surface, a plastic surface, or the like, which is provided extra. The windshield may be for example, a front glass, a side glass, or a back glass of a vehicle. In any of the above-mentioned cases, an image is displayed on the display medium.

When the display unit 30 has no projecting function, the display medium is for example, a transmission-type display, and the predetermined image that the display unit 30 generates is image data. That is, the display unit 30 causes a transmission-type display to display a presentation image, which is a visible image, by outputting the image data to the transmission-type display.

For example, the transmission-type display is a transmission-type organic electroluminescent (EL) display or a transparent display using a glass that emits light under irradiation of light with a specific wavelength, and the driver may visually recognize the background and the display on the transmission-type display at the same time. The transmission-type display is a display medium that allows light to pass through the display medium. The principle of displaying the image data input to the transmission-type display as a presentation image is known and the description of the principle is omitted.

In the present embodiment, output is defined as a superordinate concept of projection.

When the acquisition unit 10 acquires first speed limit information that indicates a first speed limit, the control unit 201 controls the display unit 30 so that the display unit 30 generates a first predetermined image representing an image that indicates the first speed limit when displayed on the display medium, and causes the display medium to display the first predetermined image.

The image that indicates the speed limit, which is mentioned here, may be an image of only numeric information on the speed limit or may be an image that includes numeric information on the speed limit like a sign. Further, the image that indicates the speed limit is an image displayed on the display medium. The predetermined image is an image generated in the display unit 30. That is, the image that is displayed on the display medium and indicates the speed limit, and the predetermined image are substantially the same in contents.

When the acquisition unit 10 acquires second speed limit information that indicates a second speed limit different from the first speed limit after acquiring the information on the first speed limit, the determination unit 202 performs determination of a relation between the first speed limit and the second speed limit, which is based on the values thereof.

When it is determined in the determination unit 202 that the first speed limit is larger than the second speed limit, by a predetermined first switching method, the control unit 201 performs switch from control of causing the display unit 30 to generate the first predetermined image and causing the display medium to display the first predetermined image to control of causing the display unit 30 to generate a second predetermined image that represents an image that indicates the second speed limit when displayed on the display medium and causing the display medium to display the second predetermined image.

In contrast, when it is determined in the determination unit 202 that the first speed limit is smaller than the second speed limit, by a second switching method different from the first switching method, the control unit 201 performs the switch from the control of causing the display unit 30 to generate the first predetermined image and causing the display medium to display the first predetermined image to the control of causing the display unit 30 to generate the second predetermined image and causing the display medium to display the second predetermined image.

The control unit 201 controls the display unit 30 by outputting control information, which indicates an instruction for the above-described switch of control and the contents of the switched control, to the display unit 30.

The display system 1 may include the above-described display medium. The display system 1 may be configured as a projection device by including the display unit 30 in the display control device 20.

The predetermined image is an image with a design set in advance and may be for example, a traffic sign indicating a speed limit or may be an image that expresses the speed limit information as digital indication using a seven-segment display or the like.

The first image or the second image described above may be generated by the display control device 20 or another constituent that is not illustrated instead of being generated by the display unit 30.

For example, the first image or the second image generated in the display system 1 is visually recognized by a driver as a virtual image. At this time, the first image or the second image may be projected on the display medium so as to be superimposed on the driver's view. The principle that the image projected on the display medium is visually recognized by a driver as a virtual image is known and the description of the principle is omitted.

A configuration example of the display system 1 according to the present embodiment is described above.

An operation example of the display system 1 according to the present embodiment is now described with reference to FIG. 2. FIG. 2 is a flowchart that illustrates the operation example of the display system 1 according to the present embodiment. The process of FIG. 2 is performed when the road section where a vehicle travels is switched. For example, FIG. 2 illustrates the process that the display system 1 performs when the vehicle enters another road section from a certain road section. The road sections mentioned herein may be distinguished as for example, a straight road, an intersection where the vehicle makes a right or left turn from the straight road, and a straight road where the vehicle travels after making the right or left turn. The road section may be for example, a road link. The road link may be managed according to identification (ID) of each road. In the description below, the road link is described as an example of the road section.

First, for example, in response to the switch of the road link where the vehicle travels, the acquisition unit 10 acquires speed limit information of the road after the switch (step S001). As an example, it is assumed here that the speed limit of a second road section where the vehicle is currently traveling is the second speed limit. The acquisition unit 10 acquires the second speed limit information that indicates the second speed limit. Further, the acquisition unit 10 has acquired the first speed limit information that indicates the first speed limit before acquiring the second speed limit information. The first speed limit is the speed limit of a first road section where the vehicle has been traveling immediately before traveling in the second road section. The first speed limit is different from the second speed limit. According to the first speed limit information, at least before acquiring the second speed limit information, the control unit 201 controls the display unit 30 so that the display unit 30 generates the first predetermined image representing the image that indicates the first speed limit when displayed on the display medium. After that, the display unit 30 causes the display medium to display the first predetermined image in accordance with the control from the control unit 201.

The image that indicates the first speed limit may be displayed on the display medium during the travel of the vehicle on the first road link, and the image that indicates the first speed limit may stop being displayed on the display medium when the vehicle starts to travel on the second road link. That is, a first timing at which the road where the vehicle travels is switched from the first road link to the second road link and a second timing at which the image that indicates the first speed limit stops being displayed on the display medium are desirably the same but need not necessarily be the same, depending on delay in processing time of a device or the like. The first timing may be earlier or later than the second timing, and the timings do not limit the scope of the present disclosure.

After that, the determination unit 202 compares the first speed limit indicated by the first speed limit information that had been previously acquired and the second speed limit indicated by the second speed limit information that has been acquired this time, and determines a change pattern of the speed limit (step S002). The determination of the change pattern is synonymous with the determination of the relation based on the values.

Although the case in which the acquisition unit 10 acquires the second speed limit information that indicates the second speed limit different from the first speed limit after acquiring the first speed limit information is explained in the description above, there is also a case in which the speed limit information acquired by the acquisition unit 10 remains unchanged even when the road section is switched. In this case, the acquisition unit 10 may output the speed limit information to the determination unit 202 and the determination unit 202 may determine whether or not the speed limit has changed (see step S011 in FIG. 3). The acquisition unit 10 may output the information to the control unit 201 without outputting the information to the determination unit 202 for the reason that the speed limit information remains unchanged. The processing performed when the speed limit remains unchanged even after the road section has been switched may be carried out by another method and the processing method does not limit the scope of the present disclosure.

As a result of the above-described determination of the change pattern, when the first speed limit is larger than the second speed limit, the determination unit 202 determines that the change pattern is a decrease pattern (step S003: YES). In this case, the process proceeds to step S004. When it is determined that the change pattern is the decrease pattern, control for causing the driver to recognize the switch of the speed limit information more easily is performed in step S004 described below. This is because when it is determined that the change pattern is the decrease pattern, the driver will possibly violate the speed limit and in that case, needs to slow down the vehicle.

In contrast, as a result of the above-described determination of the change pattern, when the first speed limit is smaller than the second speed limit, the determination unit 202 determines that the change pattern is an increase pattern (step S003: NO). In this case, the process proceeds to step S005. When it is determined that the change pattern is the increase pattern, control for preventing the driver from having visual hindrance due to the switch of the speed limit information is performed in step S005 described below. This is because when it is determined that the change pattern is the increase pattern, the driver desirably keeps driving at an optimum speed while being aware of the speed limit so as not to disturb the traffic flow of another vehicles.

After that, when it is determined in the determination unit 202 that the change pattern is the decrease pattern, the control unit 201 performs the switch from the control for causing the display unit 30 to generate the first image to the control for causing the display unit 30 to generate the second image that indicates the second speed limit by the first switching method that is predetermined (step S004). Examples of the switch of the control by the first switching method are described below with reference to FIGS. 4A through 9B.

In contrast, when it is determined in the determination unit 202 that the change pattern is the increase pattern, the control unit 201 performs the switch from the control for causing the display unit 30 to generate the first image to the control for causing the display unit 30 to generate the second image by the second switching method that is predetermined (step S005). The first switching method and the second switching method are different from each other. Examples of the switch of the control by the second switching method are described below with reference to FIGS. 4A through 9B.

In steps S004 and S005, the control unit 201 outputs the control information, which indicates an instruction for the above-described switch of control and the contents of the switched control, to the display unit 30.

After that, the display unit 30 generates the image according to the control information from the control unit 201 and projects the image onto the display medium (step S006).

The operation examples of the display system 1 according to the present embodiment are described above.

Specific examples of the switch of the control or the image displayed on the display medium by the first switching method and the second switching method explained with steps S004 and S005 in FIG. 2 are described below with reference to FIGS. 4A through 9B.

In FIGS. 4A through 9B, the vertical axis indicates the luminance of an image displayed on the display medium, which is a relative value based on a given value, while the horizontal axis indicates time during which an image indicating a speed limit is displayed on the display medium. Time T1 indicates time during which first images 101 and 103 that indicate the first speed limit are displayed on the display medium. Time T2 indicates time during which second images 102 and 104 that indicate the second speed limit are displayed on the display medium. Timing P indicates a timing at which the first images 101 and 103 stop being displayed on the display medium. The first images 101 and 103, and the second images 102 and 104 are visually recognized by an occupant as virtual images when the display medium is a HUD.

Further, in FIGS. 4A through 9B, the first images 101 and 103, and the second images 102 and 104 are for example, traffic-sign type images, on which the speed limit is indicated at the center. For example, the first image 101 is an image indicating that the speed limit (the first speed limit) is 60 km/h. For example, the second image 102 is an image indicating that the speed limit (the second speed limit) is 50 km/h. For example, the first image 103 is an image indicating that the speed limit (the first speed limit) is 50 km/h. For example, the second image 104 is an image indicating that the speed limit (the second speed limit) is 60 km/h. The first speed limit corresponds to the speed limit of the first road section and the second speed limit corresponds to the speed limit of the second road section.

SPECIFIC EXAMPLE 1

Figure 4B:
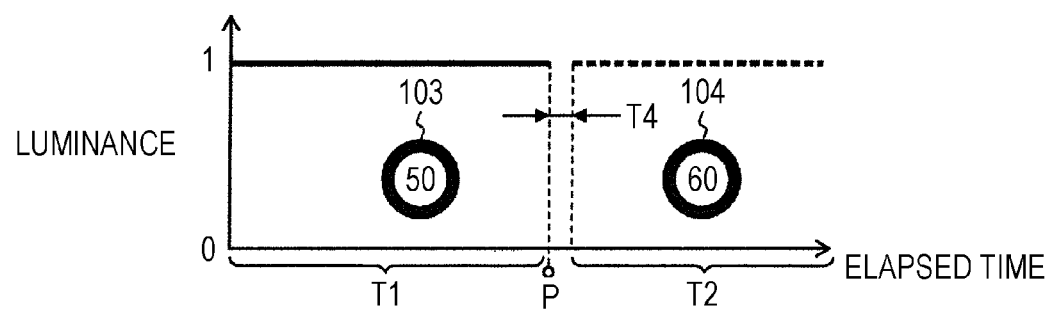
Figure 4C:
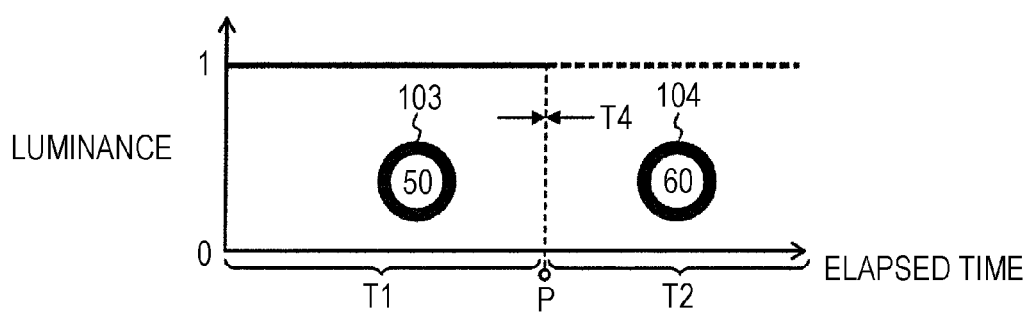

Specific example 1 is described with reference to FIGS. 4A to 4C. FIG. 4A is a diagram for explaining the specific example of the switch of the control by the first switching method. FIG. 4B is a diagram for explaining the specific example of the switch of the control by the second switching method.

First, the specific example of the switch of the control by the first switching method is described with reference to FIG. 4A. FIG. 4A serves to describe the specific example of the switch of the control, which is performed when it is determined in the determination unit 202 that the first speed limit is larger than the second speed limit.

During the time T1, the control unit 201 controls the display unit 30 so that the display unit 30 generates a predetermined image that represents the first image 101 when displayed on the display medium, and the predetermined image is displayed on the display medium at a predetermined luminance. Accordingly, the first image 101 is displayed on the display medium.

After that, in response to the entrance of the vehicle into the second road link where the speed limit is 50 km/h, when the determination unit 202 determines that the change pattern is the decrease pattern, the control unit 201 controls the display unit 30 so that the display unit 30 stops the above-described display onto the display medium by stopping generating the predetermined image that represents the first image 101 at the timing P. Accordingly, the first image 101 stops being displayed on the display medium at the timing P.

Then, after a lapse of preset time T3 of for example, 0.5 or one second, the control unit 201 controls the display unit 30 so that the display unit 30 generates a predetermined image that represents the second image 102 when displayed on the display medium and causes the display medium to display the predetermined image at a predetermined luminance, which is for example, the same as the luminance of the first image 101. Accordingly, the second image 102 is displayed on the display medium. The control unit 201 may control the display unit 30 so that the display unit 30 reads the predetermined image representing the second image 102, which is generated in advance, out from a predetermined storage device and causes the predetermined image to be displayed at the predetermined luminance.

Thus, in the decrease pattern, the control unit 201 controls the display unit 30 so that the second image 102 is displayed on the display medium after the certain time T3 has elapsed after the first image 101 had disappeared on the display medium. Accordingly, the switch of the image is more noticeable and the driver may recognize the switch of the image more easily. For example, the driver may feel the switch of the image even when not gazing at the display medium.

The specific example of the switch of the control by the second switching method is described with reference to FIG. 4B. FIG. 4B serves to describe the specific example of the switch of the control when it is determined in the determination unit 202 that the first speed limit is smaller than the second speed limit.

During the time T1, the control unit 201 controls the display unit 30 so that the display unit 30 generates a predetermined image that represents the first image 103 when displayed on the display medium, and causes the predetermined image to be displayed on the display medium at a predetermined luminance. Accordingly, the first image 103 is displayed on the display medium.

After that, in response to the entrance of the vehicle into the second road link where the speed limit is 60 km/h, when the determination unit 202 determines that the change pattern is the increase pattern, the control unit 201 controls the display unit 30 so that the display unit 30 stops the above-described display onto the display medium at the timing P by stopping generating the predetermined image that represents the first image 103. Accordingly, the first image 103 stops being displayed on the display medium at the timing P.

Then, after a lapse of preset time T4, which is for example, equal to or more than zero and less than the time T3, the control unit 201 controls the display unit 30 so that the display unit 30 generates a predetermined image that represents the second image 104 when displayed on the display medium, and causes the predetermined image to be displayed on the display medium at the predetermined luminance. Accordingly, the second image 104 is displayed on the display medium.

In general, it is said that a critical flicker frequency (CFF), which is a critical frequency of the brightness and darkness that a human being can sense ranges from 30 to 40 Hz. The time T4 may be set to a value equal to or smaller than 20 msec for example, according to the CFF. The first image 103 may be immediately switched to the second image 104 by setting the time T4 to zero as illustrated in FIG. 4C. Setting the time T4 to zero may further reduce the visual hindrance that the switch of the image brings to the driver. That is, the time T4 is equal to or more than zero and less than the time T3.

It is described above that when the speed limit remains unchanged even after the switch of the road section, the control unit 201 need not switch the control although the control is switched in the increase pattern or the decrease pattern. When the time T4 is zero as illustrated in FIG. 4C, even if the speed limit remains unchanged, the process may be performed as a case similar to the increase pattern. When the speed limit remains unchanged even after the road section has been switched, the process may be performed in another processing method and the processing method does not limit the scope of the present disclosure.

Thus, in the increase pattern, the second image 104 is displayed after the certain time T4 has elapsed after the first image 103 had disappeared. As a result, compared to the decrease pattern, the switch of the image is less noticeable and the driver is less likely to feel visually hindered by the switch of the image.

The timing at which the vehicle enters the second road section from the first road section and the timing P are desirably the same because this enables the driver to be informed of the change in the information on the speed limit in real time. However, according to the present disclosure, the timing at which the vehicle enters the second road section from the first road section and the timing P need not necessarily be the same and a difference of given time is allowable between the timings while not limiting the scope of the present disclosure. This is also applicable to the specific examples described below.

SPECIFIC EXAMPLE 2

Specific example 2 is described with reference to FIGS. 5A and 5B. FIG. 5A is a diagram for explaining the specific example of the switch of the control by the first switching method. FIG. 5B is a diagram for explaining the specific example of the switch of the control by the second switching method.

First, the specific example of the switch of the control by the first switching method is described with reference to FIG. 5A. FIG. 5A serves to describe the specific example of the switch of the control, which is performed when it is determined in the determination unit 202 that the first speed limit is larger than the second speed limit.

During the time T1, the control unit 201 controls the display unit 30 so that the display unit 30 generates the predetermined image that represents the first image 101 when displayed on the display medium, and causes the predetermined image to be displayed on the display medium at a first luminance B1. Accordingly, the first image 101 is displayed on the display medium.

After that, in response to the entrance of the vehicle into the second road link where the speed limit is 50 km/h, when the determination unit 202 determines that the change pattern is the decrease pattern, the control unit 201 controls the display unit 30 so that the display unit 30 stops the above-described display onto the display medium at the timing P by stopping generating the predetermined image that represents the first image 101. Accordingly, the first image 101 stops being displayed on the display medium at the timing P.

Further, the control unit 201 controls the display unit 30 so that the display unit 30 generates the predetermined image that represents the second image 102 when displayed on the display medium, and causes the predetermined image to be displayed on the display medium at a second luminance B2, which differs from the first luminance B1 by an absolute value M1. Accordingly, the second image 102 is displayed on the display medium. In FIG. 5A, as an example, the second luminance B2 has a value larger than the value of the first luminance B1. The absolute value M1 is a value larger than an absolute value M2 of the increase pattern, which is described below.

Then, after the display of the second image 102, the control unit 201 controls the display unit 30 so that the second luminance B2 gradually returns to the first luminance B1 from a predetermined timing.

After that, the specific example of the switch of the control by the second switching method is described with reference to FIG. 5B. FIG. 5B serves to describe the specific example of the switch of the control, which is performed when it is determined in the determination unit 202 that the first speed limit is smaller than the second speed limit.

During the time T1, the control unit 201 controls the display unit 30 so that the display unit 30 generates the predetermined image that represents the first image 103 when displayed on the display medium, and causes the predetermined image to be displayed on the display medium at the first luminance B1. Accordingly, the first image 103 is displayed on the display medium.

After that, in response to the entrance of the vehicle into the second road link where the speed limit is 60 km/h, when the determination unit 202 determines that the change pattern is the increase pattern, the control unit 201 controls the display unit 30 so that the display unit 30 stops the display onto the display medium at the timing P by stopping generating the predetermined image that represents the first image 103. Accordingly, the first image 103 stops being displayed on the display medium at the timing P.

Further, the control unit 201 controls the display unit 30 so that the display unit 30 generates the predetermined image that represents the second image 104 when displayed on the display medium, and causes the predetermined image to be displayed on the display medium at a third luminance B3, which differs from the first luminance B1 by the absolute value M2. Accordingly, the second image 104 is displayed on the display medium. In FIG. 5B, as an example, the third luminance B3 has a value larger than the value of the first luminance B1 and smaller than the value of the second luminance B2. The absolute value M2 is a value smaller than the above-described absolute value M1 of the decrease pattern.

Then, after the display of the second image 104, the control unit 201 controls the display unit 30 so that the third luminance B3 gradually returns to the first luminance B1 from a predetermined timing.

Thus, in the decrease pattern, the change in the luminance is large at the time of the switch from the first image 101 to the second image 102 on the display medium, compared to the increase pattern. Accordingly, the switch of the image is more noticeable and the driver may recognize the switch of the image more easily. For example, the driver may feel the switch of the image even when not gazing at the display medium. In contrast, in the increase pattern, the change in the luminance at the time of the switch from the first image 103 to the second image 104 on the display medium is small, compared to the decrease pattern. Accordingly, the switch of the image is less noticeable and the driver is less likely to feel visually hindered by the switch of the image, compared to the decrease pattern.

Although the case in which both the second luminance B2 and the third luminance B3 are larger than the first luminance B1 is described above as an example, the luminance is not limited thereto. That is, in the present specific example, as long as the condition that the absolute value M2 is smaller than the absolute value M1 is satisfied, the second luminance B2 or the third luminance B3 may be the same as the first luminance B1 or may be less than the first luminance B1.

SPECIFIC EXAMPLE 3

Specific example 3 is described with reference to FIGS. 6A and 6B. FIG. 6A is a diagram for explaining the specific example of the switch of the control by the first switching method. FIG. 6B is a diagram for explaining the specific example of the switch of the control by the second switching method.

First, the specific example of the switch of the control by the first switching method is described with reference to FIG. 6A. FIG. 6A serves to describe the specific example of the switch of the control, which is performed when it is determined in the determination unit 202 that the first speed limit is larger than the second speed limit.

During the time T1, the control unit 201 controls the display unit 30 so that the display unit 30 generates the predetermined image that represents the first image 101 when displayed on the display medium, and causes the predetermined image to be displayed on the display medium at the first luminance B1. Accordingly, the first image 101 is displayed on the display medium.

After that, in response to the entrance of the vehicle into the second road link where the speed limit is 50 km/h, when the determination unit 202 determines that the change pattern is the decrease pattern, the control unit 201 controls the display unit 30 so that the display unit 30 stops the above-described display onto the display medium at the timing P by stopping generating the predetermined image that represents the first image 101. Accordingly, the first image 101 stops being displayed on the display medium at the timing P.

Further, the control unit 201 controls the display unit 30 so that the display unit 30 generates the predetermined image that represents the second image 102 when displayed on the display medium, and causes the predetermined image to be displayed on the display medium by gradually increasing the luminance from the first luminance B1 to the second luminance B2 during preset time T5. Accordingly, the second image 102 is displayed on the display medium. Although in FIG. 6A, as an example, the second luminance B2 has a value larger than the value of the first luminance B1, the second luminance B2 may have a value smaller than the value of the first luminance B1. The time T5 has a value smaller than the value of time T6 of the increase pattern, which is described below.

Then, after the display of the second image 102, the control unit 201 controls the display unit 30 so that the second luminance B2 gradually returns to the first luminance B1 from a predetermined timing.

After that, the specific example of the switch of the control by the second switching method is described with reference to FIG. 6B. FIG. 6B serves to describe the specific example of the switch of the control, which is performed when it is determined in the determination unit 202 that the first speed limit is smaller than the second speed limit.

During the time T1, the control unit 201 controls the display unit 30 so that the display unit 30 generates the predetermined image that represents the first image 103 when displayed on the display medium, and causes the predetermined image to be displayed on the display medium at the first luminance B1. Accordingly, the first image 103 is displayed on the display medium.

After that, in response to the entrance of the vehicle into the second road link where the speed limit is 60 km/h, when the determination unit 202 determines that the change pattern is the increase pattern, the control unit 201 controls the display unit 30 so that the display unit 30 stops the above-described display onto the display medium at the timing P by stopping generating the predetermined image that represents the first image 103. Accordingly, the first image 103 stops being displayed on the display medium at the timing P.

Further, the control unit 201 controls the display unit 30 so that the display unit 30 generates the predetermined image that represents the second image 104 when displayed on the display medium, and causes the predetermined image to be displayed on the display medium by gradually increasing the luminance from the first luminance B1 to the second luminance B2 during the preset time T6. Accordingly, the second image 104 is displayed on the display medium. Although in FIG. 6B, as an example, the second luminance B2 has a value larger than the value of the first luminance B1, the second luminance B2 may have a value smaller than the value of the first luminance B1. The time T6 has a value larger than the value of the above-described time T5 of the decrease pattern.

Then, after the display of the second image 104, the control unit 201 controls the display unit 30 so that the second luminance B2 gradually returns to the first luminance B1 from a predetermined timing.

Thus, in the decrease pattern, the change in the luminance at the time of the switch from the first image 101 to the second image 102 on the display medium is abrupt, compared to the increase pattern. Accordingly, the switch of the image is more noticeable and the driver may recognize the switch of the image more easily. For example, the driver may feel the switch of the image even when not gazing at the display medium. In contrast, in the increase pattern, the change in the luminance at the time of the switch from the first image 103 to the second image 104 on the display medium is gentle, compared to the decrease pattern. Thus, compared to the decrease pattern, the switch of the image is less noticeable and the driver is less likely to feel visually hindered by the switch of the image.

SPECIFIC EXAMPLE 4

Specific example 4 is described with reference to FIGS. 7A and 7B. FIG. 7A is a diagram for explaining the specific example of the switch of the control by the first switching method. FIG. 7B is a diagram for explaining the specific example of the switch of the control by the second switching method.

First, the specific example of the switch of the control by the first switching method is described with reference to FIG. 7A. FIG. 7A serves to describe the specific example of the switch of the control, which is performed when it is determined in the determination unit 202 that the first speed limit is larger than the second speed limit.

During the time T1, the control unit 201 controls the display unit 30 so that the display unit 30 generates the predetermined image that represents the first image 101 when displayed on the display medium, and causes the predetermined image to be displayed on the display medium at a predetermined luminance. Accordingly, the first image 101 is displayed on the display medium.

After that, in response to the entrance of the vehicle into the second road link where the speed limit is 50 km/h, when the determination unit 202 determines that the change pattern is the decrease pattern, the control unit 201 controls the display unit 30 so that the display unit 30 stops the above-described display onto the display medium at the timing P by stopping generating the predetermined image that represents the first image 101. Accordingly, the first image 101 stops being displayed on the display medium at the timing P.

Further, the control unit 201 controls the display unit 30 so that the display unit 30 generates the predetermined image that represents the second image 102 when displayed on the display medium, and causes the predetermined image to be displayed on the display medium by gradually increasing the luminance during preset time T7. Accordingly, the second image 102 is displayed on the display medium. Although in FIG. 7A, as an example, the luminance of the second image 102 is increased to the same as the luminance of the first image 101, the luminance of the second image 102 may be increased to a predetermined luminance larger than the luminance of the first image 101. The time T7 has a value smaller than the value of time T8 of the increase pattern, which is described below, and is for example, larger than a value of 20 msec, which is set according to the above-described CFF. That is, the expression, 20 msec<T7<T8 is satisfied.

The specific example of the switch of the control by the second switching method is described with reference to FIG. 7B. FIG. 7B serves to describe the specific example of the switch of the control, which is performed when it is determined in the determination unit 202 that the first speed limit is smaller than the second speed limit.

During the time T1, the control unit 201 controls the display unit 30 so that the display unit 30 generates the predetermined image that represents the first image 103 when displayed on the display medium, and causes the predetermined image to be displayed on the display medium at a predetermined luminance. Accordingly, the first image 103 is displayed on the display medium.

After that, in response to the entrance of the vehicle into the second road link where the speed limit is 60 km/h, when the determination unit 202 determines that the change pattern is the increase pattern, the control unit 201 controls the display unit 30 so that the display unit 30 stops the above-described display onto the display medium at the timing P by stopping generating the predetermined image that represents the first image 103. Accordingly, the first image 103 stops being displayed on the display medium at the timing P.

Further, the control unit 201 controls the display unit 30 so that the display unit 30 generates the predetermined image that represents the second image 104 when displayed on the display medium, and causes the predetermined image to be displayed on the display medium by gradually increasing the luminance during the preset time T8. Accordingly, the second image 104 is displayed on the display medium. Although in FIG. 7B, as an example, the luminance of the second image 104 is increased to the same as the luminance of the first image 103, the luminance of the second image 104 may be increased to a predetermined luminance larger than the luminance of the first image 103. The time T8 has a value larger than the value of the above-described time T7 of the decrease pattern.

Thus, in the decrease pattern, the change in the luminance at the time of the switch from the first image 101 to the second image 102 on the display medium is abrupt, compared to the increase pattern. Accordingly, the switch of the image is more noticeable and the driver may recognize the switch of the image more easily. For example, the driver may feel the switch of the image even when not gazing at the display medium. In contrast, in the increase pattern, the change in the luminance at the time of the switch from the first image 103 to the second image 104 on the display medium is gentle, compared to the decrease pattern. Thus, compared to the decrease pattern, the switch of the image is less noticeable and the driver is less likely to feel visually hindered by the switch of the image.

SPECIFIC EXAMPLE 5

Specific example 5 is described with reference to FIGS. 8A and 8B. FIG. 8A is a diagram for explaining the specific example of the switch of the control by the first switching method. FIG. 8B is a diagram for explaining the specific example of the switch of the control by the second switching method.

The present specific example specifically describes a case in which the acquisition unit 10 acquires the second speed limit information correlated with the second road link and the determination unit 202 performs determination of the change pattern at a predetermined timing in the time T1. The predetermined timing is for example, a few seconds or a dozen or so seconds before the timing at which the vehicle enters the second road link. The method of acquiring the second speed limit information includes acquiring the second road link connected to the first road link and the speed limit information in advance by referring to a map information database where connection information of the road links is stored while traveling on the first road link. When a plurality of road links are connected to the first road link, the information on the second road link may be acquired by acquiring the road link where the driver's own car will travel from navigation information.

First, the specific example of the switch of the control by the first switching method is described with reference to FIG. 8A. FIG. 8A serves to describe the specific example of the switch of the control, which is performed when it is determined in the determination unit 202 that the first speed limit is larger than the second speed limit.

During time included in the time T1 and before the time T7, the control unit 201 controls the display unit 30 so that the display unit 30 generates the predetermined image that represents the first image 101 when displayed on the display medium, and causes the predetermined image to be displayed on the display medium at a predetermined luminance. Accordingly, the first image 101 is displayed on the display medium.

After that, when the determination unit 202 determines that the change pattern is the decrease pattern at a predetermined timing before the timing P, the control unit 201 controls the display unit 30 so that the display unit 30 stops the above-described display onto the display medium at the timing P by gradually decreasing the luminance during the preset time T7 and stopping the display of the predetermined image that represents the first image 101. The time T7 has the value described in above-described specific example 4. Accordingly, the first image 101 stops being displayed on the display medium at the timing P.

Further, in response to the entrance of the vehicle into the second road link where the speed limit is 50 km/h, the control unit 201 controls the display unit 30 so that the display unit 30 generates the predetermined image that represents the second image 102 when displayed on the display medium, and causes the predetermined image to be displayed on the display medium at the predetermined luminance. Accordingly, the second image 102 is displayed on the display medium. Although in FIG. 8A, as an example, the luminance of the second image 102 is the same as the luminance of the first image 101, the luminance of the second image 102 may be a predetermined luminance larger than the luminance of the first image 101.

The specific example of the switch of the control by the second switching method is described with reference to FIG. 8B. FIG. 8B serves to describe the specific example of the switch of the control, which is performed when it is determined in the determination unit 202 that the first speed limit is smaller than the second speed limit.

During time included in the time T1 and before the time T8, the control unit 201 controls the display unit 30 so that the display unit 30 generates the predetermined image that represents the first image 103 when displayed on the display medium, and causes the predetermined image to be displayed on the display medium at the predetermined luminance. Accordingly, the first image 103 is displayed on the display medium.

After that, when the determination unit 202 determines that the change pattern is the increase pattern at a predetermined timing before the timing P, the control unit 201 controls the display unit 30 so that the display unit 30 stops the above-described display onto the display medium at the timing P by gradually decreasing the luminance during the preset time T8 and stopping the display of the predetermined image that represents the first image 103. The time T8 has the value described in above-described specific example 4. Accordingly, the first image 103 stops being displayed on the display medium at the timing P.

Further, in response to the entrance of the vehicle into the second road link where the speed limit is 60 km/h, the control unit 201 controls the display unit 30 so that the display unit 30 generates the predetermined image that represents the second image 104 when displayed on the display medium, and causes the predetermined image to be displayed on the display medium at the predetermined luminance. Accordingly, the second image 104 is displayed on the display medium. Although in FIG. 8B, as an example, the luminance of the second image 104 is the same as the luminance of the first image 103, the luminance of the second image 104 may be a predetermined luminance larger than the luminance of the first image 103.

Thus, in the decrease pattern, the change in the luminance at the time of the switch from the first image 101 to the second image 102 on the display medium is abrupt, compared to the increase pattern. Accordingly, the switch of the image is more noticeable and the driver may recognize the switch of the image more easily. For example, the driver may feel the switch of the image even when not gazing at the display medium. In contrast, in the increase pattern, the change in the luminance at the time of the switch from the first image 103 to the second image 104 on the display medium is gentle, compared to the decrease pattern. Thus, compared to the decrease pattern, the switch of the image is less noticeable and the driver is less likely to feel visually hindered by the switch of the image.

SPECIFIC EXAMPLE 6

Specific example 6 is described with reference to FIGS. 9A and 9B. The present specific example is an example in which specific example 4 and specific example 5 are combined. FIG. 9A is a diagram for explaining the specific example of the switch of the control by the first switching method. FIG. 9B is a diagram for explaining the specific example of the switch of the control by the second switching method.

First, the specific example of the switch of the control by the first switching method is described with reference to FIG. 9A. FIG. 9A serves to describe the specific example of the switch of the control, which is performed when it is determined in the determination unit 202 that the first speed limit is larger than the second speed limit.

During time included in the time T1 and before the time T7, the control unit 201 controls the display unit 30 so that the display unit 30 generates the predetermined image that represents the first image 101 when displayed on the display medium, and causes the predetermined image to be displayed on the display medium at a predetermined luminance. Accordingly, the first image 101 is displayed on the display medium.

After that, when the determination unit 202 determines that the change pattern is the decrease pattern at a predetermined timing before the timing P, the control unit 201 controls the display unit 30 so that the display unit 30 stops the above-described display onto the display medium at the timing P by gradually decreasing the luminance and stopping the display of the predetermined image that represents the first image 101 during the time T7. Accordingly, the first image 101 stops being displayed on the display medium at the timing P.

Further, in response to the entrance of the vehicle into the second road link where the speed limit is 50 km/h, the control unit 201 controls the display unit 30 so that the display unit 30 generates the predetermined image that represents the second image 102 when displayed on the display medium, and causes the predetermined image to be displayed on the display medium by gradually increasing the luminance during the time T7. Accordingly, the second image 102 is displayed on the display medium.

The time T7 has a value smaller than the value of time T8 of the increase pattern, which is described below, and is for example, larger than a value of 20 msec set according to the above-described CFF. That is, the expression, 20 msec/2<T7<T8 is satisfied.

The specific example of the switch of the control by the second switching method is described with reference to FIG. 9B. FIG. 9B serves to describe the specific example of the switch of the control, which is performed when it is determined in the determination unit 202 that the first speed limit is smaller than the second speed limit.

During time included in the time T1 and before the time T8, the control unit 201 controls the display unit 30 so that the display unit 30 generates the predetermined image that represents the first image 103 when displayed on the display medium, and causes the predetermined image to be displayed on the display medium at a predetermined luminance. Accordingly, the first image 103 is displayed on the display medium.

After that, when the determination unit 202 determines that the change pattern is the increase pattern at a predetermined timing before the timing P, the control unit 201 controls the display unit 30 so that the display unit 30 stops the above-described display onto the display medium at the timing P by gradually decreasing the luminance during the time T8 and stopping the display of the predetermined image that represents the first image 103. Accordingly, the first image 103 stops being displayed on the display medium at the timing P.

Further, in response to the entrance of the vehicle into the second road link where the speed limit is 60 km/h, the control unit 201 controls the display unit 30 so that the display unit 30 generates the predetermined image that represents the second image 104 when displayed on the display medium, and causes the predetermined image to be displayed on the display medium by gradually increasing the luminance during the time T8. Accordingly, the second image 104 is displayed on the display medium.

Thus, in the decrease pattern, the change in the luminance at the time of the switch from the first image 101 to the second image 102 on the display medium is abrupt, compared to the increase pattern. Accordingly, the switch of the image is more noticeable and the driver may recognize the switch of the image more easily. For example, the driver may feel the switch of the image even when not gazing at the display medium. In contrast, in the increase pattern, the change in the luminance at the time of the switch from the first image 103 to the second image 104 on the display medium is gentle, compared to the decrease pattern. Thus, compared to the decrease pattern, the switch of the image is less noticeable and the driver is less likely to feel visually hindered by the switch of the image.

The switch of the control by the first switching method and the second switching method, which correspond to steps S004 and S005 in FIG. 2, respectively, are described above. Above-described specific examples 1 to 6 may be combined as desired.

As described above, according to the present embodiment, when the importance of the visual recognition of the speed limit information is high, that is, in the decrease pattern, the switch of the image is more noticeable and the driver may recognize the switch of the image more easily. Further, according to the present embodiment, when the importance of the visual recognition of the speed limit information is low, that is, in the increase pattern, the switch of the image is less noticeable and the driver is less likely to feel visually hindered by the switch of the image. Accordingly, according to the present embodiment, the visibility of the speed limit displayed on the display medium may be enhanced.

Although the embodiment of the present disclosure is described above, the present disclosure is not limited to the above-described embodiment and may be changed variously. Variations are described below.

<Variation 1>

Although in the above-described embodiment, the image that indicates the speed limit, which is for example, the first image or the second image, has a shape of a traffic sign type, the shape of the image is not limited thereto. Another examples of the image are described with reference to FIGS. 10A to 10D.

Figure 10C:
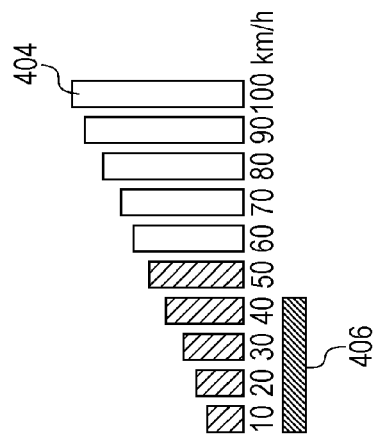
FIGS. 10A, 10B, 10C, and 10D are diagrams that each illustrate an image display example according to embodiment 1 of the present disclosure.
Figure 10D:
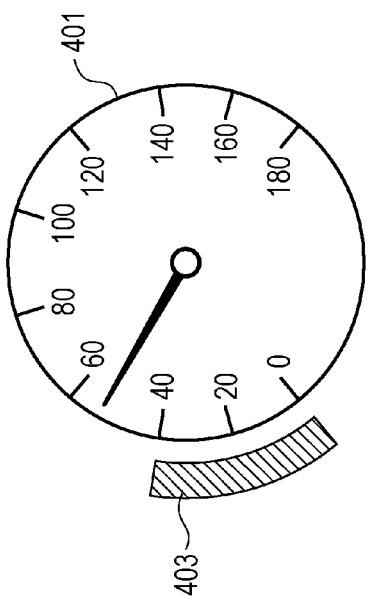
Figure 10A:
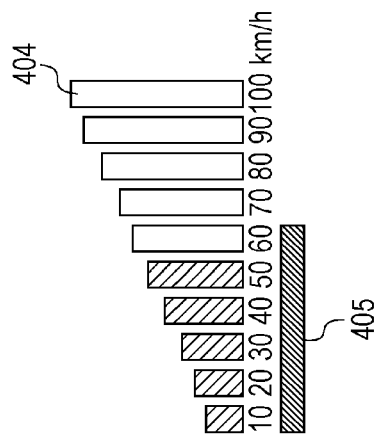
Figure 10B:
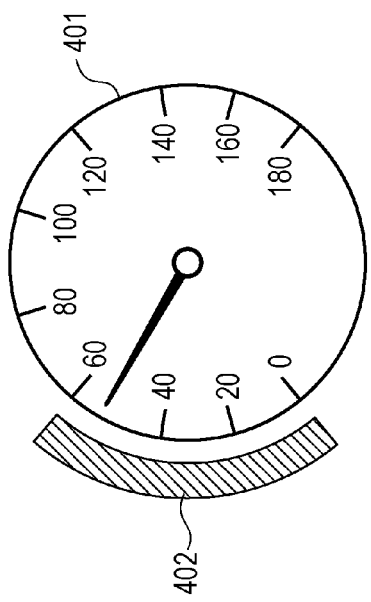

FIGS. 10A and 10B illustrate examples in which an image 402 and an image 403 are displayed near a circular speedometer 401, respectively. Each of the images 402 and 403 is shaped along the circumference of the speedometer 401. The image 402 illustrated in FIG. 10A indicates that the speed limit of the road link where the vehicle is traveling is 60 km/h. The image 403 illustrated in FIG. 10B indicates that the speed limit of the road link where the vehicle is traveling is 40 km/h.

FIGS. 10C and 10D illustrate examples in which an image 405 and an image 406 are respectively displayed near a speedometer 404 made up of a plurality of bars with different lengths. Each of the images 405 and 406 is perpendicular to each of the bars of the speedometer 404. The image 405 illustrated in FIG. 10C indicates that the speed limit of the road link where the vehicle is traveling is 60 km/h. The image 406 illustrated in FIG. 10D indicates that the speed limit of the road link where the vehicle is traveling is 40 km/h.

<Variation 2>

Although in the above-described embodiment, the number of determination results for the change pattern is two, that is, the increase pattern or the decrease pattern, the determination results for the change pattern may be sorted into three or more patterns, depending on the degree of the decrease or the increase. For example, the decrease pattern and the increase pattern may be further sorted into detailed patterns, which are a decrease pattern Large, a decrease pattern Small, an increase pattern Large, and an increase pattern Small. The decrease pattern Large is a pattern in which the degree of the decrease in the speed limit is larger than the degree of the decrease in the speed limit in the decrease pattern Small. The increase pattern Large is a pattern in which the degree of the increase in the speed limit is larger than the degree of the increase in the speed limit in the increase pattern Small. This case is described with reference to specific example 1. For example, when FIG. 4A indicates the decrease pattern Small, a value larger than the value of the time T3 is used in the decrease pattern Large. Accordingly, when the degree of the decrease in the speed limit is larger than the degree of the decrease in the speed limit in the decrease pattern Small, the switch of the image is more noticeable and the driver may recognize the switch of the image more easily. When for example, FIG. 4B illustrates the increase pattern Large, a value smaller than the value of the time T4 is used in the increase pattern Small. Accordingly, when the degree of the increase in the speed limit is smaller than the degree of the increase in the speed limit in the increase pattern Large, the switch of the image is less noticeable and the driver is less likely to feel visually hindered by the switch of the image. The present variation is applicable to another specific example.

<Variation 3>

Although in the above-described embodiment, the speed limit information is correlated with each road section in the map information in advance and stored in the predetermined storage device, and the acquisition unit 10 acquires the speed limit information from the predetermined storage device, the acquisition of the speed limit information is not limited thereto. For example, the speed limit information may be acquired through road-automobile communication or may be acquired from image information, such as a traffic sign. When the speed limit information is acquired from the image information, such as a traffic sign, for example, the acquisition unit 10 acquires the image information of the traffic sign whose image is taken by an in-vehicle camera, which is a traffic sign indicating a speed limit. After that, the acquisition unit 10 or an image processing unit that is not illustrated performs image analysis of the above-described image information and extracts the speed limit information.

<Variation 4>

The method of the switch from the first image to the second image in the decrease pattern, that is, the first switching method, is not limited to the method described in above-described specific examples 1 to 6. For example, the second image may be displayed so as to be larger than the first image. As another example, the second image may be displayed in a color different from the color of the first image. As another example, the second image may be displayed so as to have a shape different from the shape of the first image. As another example, the second image may be displayed in a predetermined motion. Accordingly, the driver may recognize the switch of the image more easily.

<Variation 5>

Although in the above-described embodiment, the control unit 201 controls the display unit 30 so that the display unit 30 generates the first image or the second image and causes the generated image to be displayed on the display medium, the displaying process is not limited thereto. For example, the control unit 201 may control the display unit 30 so that the display unit 30 reads the first image or the second image that has been generated in advance from a predetermined storage device and causes the read image to be displayed on the display medium.

<Variation 6>

The configuration of the display system 1 is not limited to the configuration illustrated in FIG. 1. Another configuration example of the display system 1 is described using FIG. 11.

Figure 11:
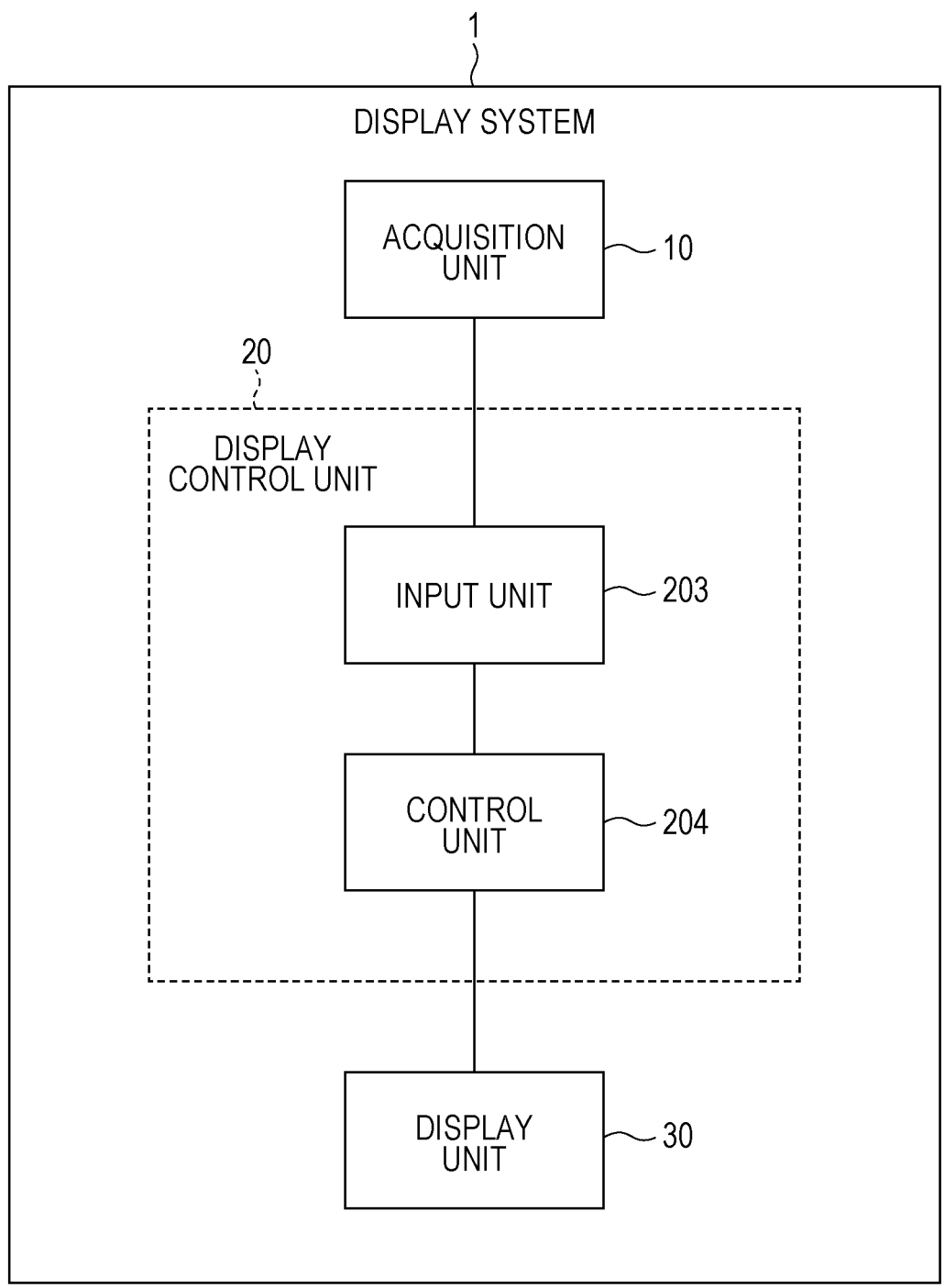
FIG. 11 is a block diagram that illustrates another configuration example of the display system according to embodiment 1 of the present disclosure.

FIG. 11 is a block diagram that illustrates the other configuration example of the display system 1 according to the present embodiment. Differences between the present configuration example and the configuration example illustrated in FIG. 1 are described below.

The display control device 20 includes an input unit 203 and a control unit 204.

The input unit 203 receives the speed limit information, which is the information on the speed limit of the road where the vehicle travels, from the acquisition unit 10. The control unit 204 have functions similar to the functions of the control unit 201 and the determination unit 202 illustrated in FIG. 1, and controls the display unit 30, which generates a predetermined image based on the speed limit information and outputs the predetermined image to the display medium.

Specifically, the control unit 204 causes the display unit 30 to generate the first predetermined image representing the first presentation image, which is a visible image indicating the first speed limit. Further, the control unit 204 recognizes the change in the speed limit of the road where the vehicle travels, which is the change from the first speed limit to the second speed limit different from the first speed limit.

When the first speed limit is larger than the second speed limit, the control unit 204 causes the display unit 30 to perform switch from the generation of the first predetermined image to the generation of the second predetermined image, which is a visible image indicating the second speed limit by the first switching method. For example, the first switching method is the switching method described with reference to FIGS. 4A, 5A, 6A, 7A, 8A, and 9A.

In contrast, when the first speed limit is smaller than the second speed limit, the control unit 204 causes the display unit 30 to perform the switch from the generation of the first predetermined image to the generation of the second predetermined image by the second switching method different from the first switching method. For example, the second switching method is the switching method described with reference to FIGS. 4B, 4C, 5B, 6B, 7B, 8B, and 9B.

Figure 12:
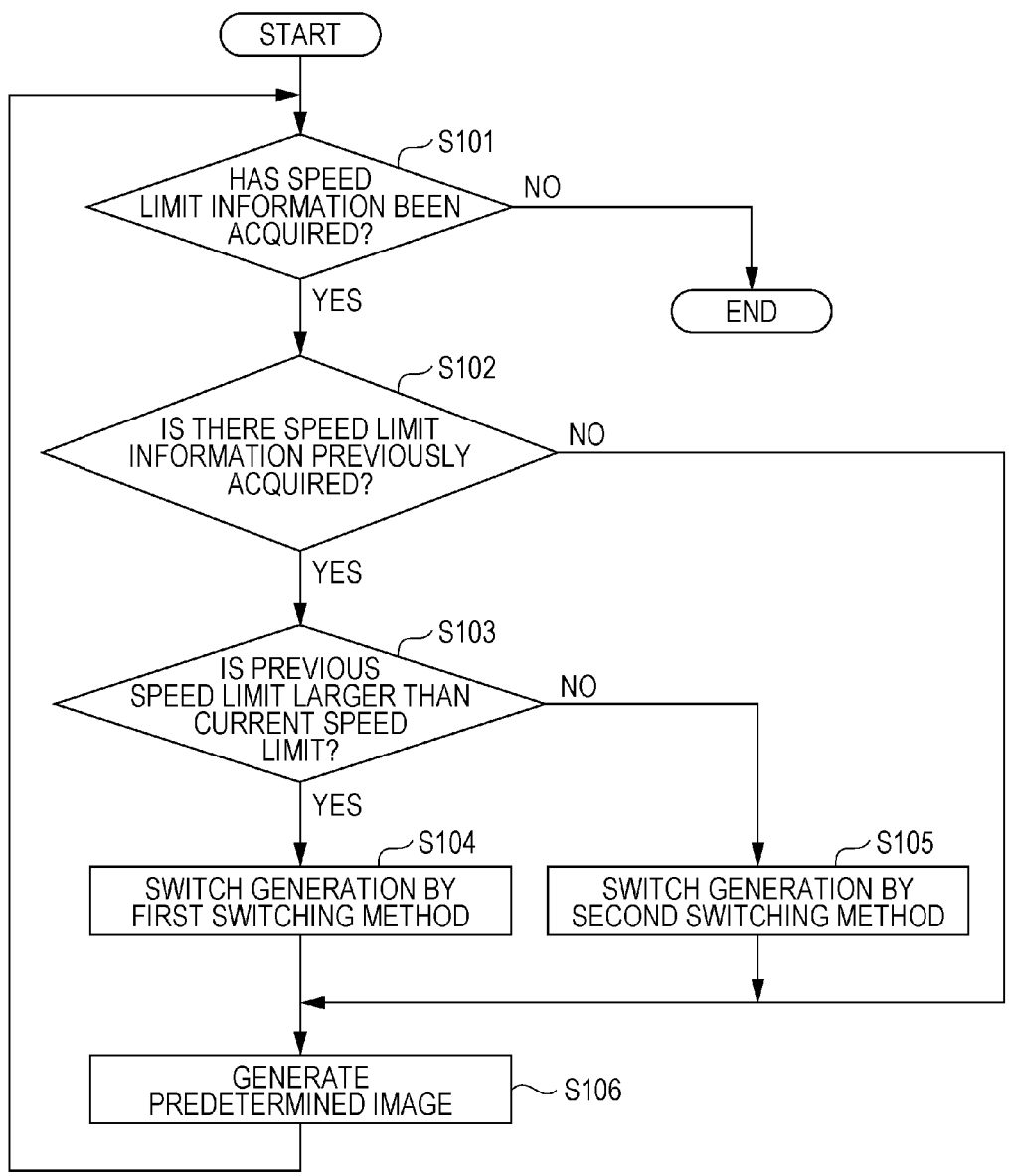
FIG. 12 is a flowchart that illustrates another operation example of the display system according to embodiment 1 of the present disclosure.

An operation example of the display system 1 according to the present variation is described with reference to FIG. 12. FIG. 12 is a flowchart that illustrates the operation example of the display system 1 according to the present variation.

First, the control unit 204 determines whether or not the input unit 203 has acquired the speed limit information from the acquisition unit 10 (step S101).

If the input unit 203 has not acquired the speed limit information (step S101: NO), the process ends. In this case, from step S101, the process in FIG. 12 is performed again after a lapse of predetermined time.

If the input unit 203 has acquired the speed limit information (step S101: YES), the control unit 204 determines whether or not there is the speed limit information that had been previously acquired (step S102).

When there is not the speed limit information that had been previously acquired (step S102: NO), the control unit 204 generates the first predetermined image, which is included in for example, the first images 101 and 103 in FIGS. 4A through 9B. After that, the process returns to step S101.

When there is the speed limit information, that is, the information on the first speed limit that had been previously acquired (step S102: YES), the control unit 204 determines whether or not the speed limit indicated by the speed limit information that had been previously acquired, which is referred to as the previous speed limit or the first speed limit, is larger than the speed limit indicated by the speed limit information that has been acquired this time, which is referred to as the current speed limit or the second speed limit (step S103).

When the previous speed limit is larger than the current speed limit (step S103: YES), the control unit 204 causes the display unit 30 to perform the switch from the generation of the first predetermined image to the generation of the second predetermined image representing the second presentation image that indicates the current speed limit, which is included in for example, the second images 102 and 104 illustrated in FIGS. 4A through 9B, by the first switching method (step S104).

When the previous speed limit is not larger than the current speed limit (step S103: NO), the control unit 204 causes the display unit 30 to perform the switch from the generation of the first predetermined image to the generation of the second predetermined image by the second switching method different from the first switching method (step S105).

After that, the display unit 30 generates the image according to the control information from the control unit 204 and outputs the image to the display medium (step S106).

The variations of embodiment 1 according to the present disclosure are described above. The above-described variations may be combined as desired.

Embodiment 2

Embodiment 2 of the present disclosure is described with reference to the drawings.

Figure 13:
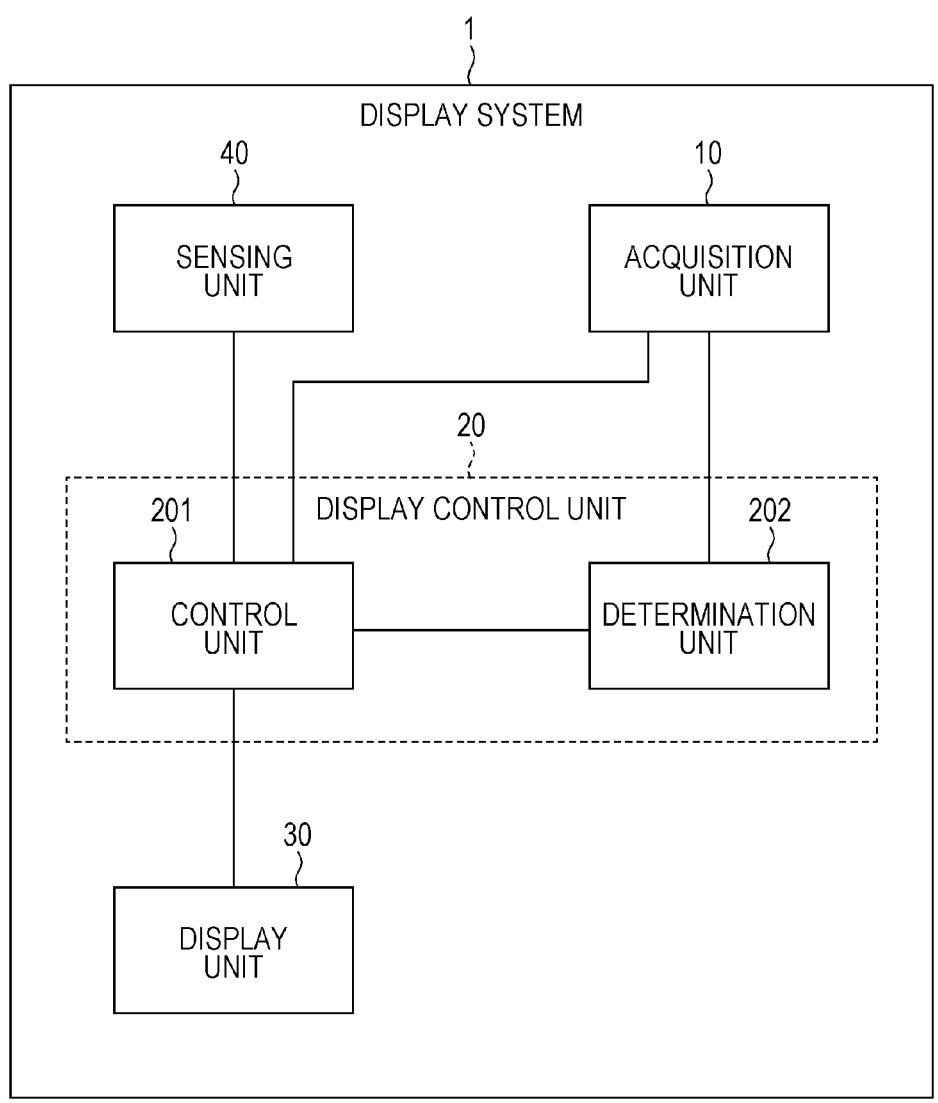
FIG. 13 is a block diagram that illustrates a configuration example of a display system according to embodiment 2 of the present disclosure.

A configuration example of the display system 1 according to the present embodiment is described with reference to FIG. 13. FIG. 13 is a block diagram of the configuration example of the display system 1 according to the present embodiment. Differences between the present configuration example and the configuration example according to embodiment 1 (see for example, FIG. 1) are described below.

The display system 1 further includes a sensing unit 40 that senses location information of a vehicle.

The acquisition unit 10 acquires information on a speed limit of a road section.

If the sensing unit 40 has sensed that a vehicle is present in a first section, the control unit 201 controls the display unit 30 so that the display unit 30 generates a first predetermined image representing the image that indicates a first speed limit of the first section when displayed on the display medium, which has been acquired in the acquisition unit 10, and causes the first predetermined image to be displayed on the display medium.

If the sensing unit 40 has sensed move of the vehicle from the first section into a second section, the determination unit 202 determines the relation, based on the values, between the first speed limit and a second speed limit of the second section acquired by the acquisition unit 10. The "move of the vehicle" mentioned herein may be the move of the vehicle in the past or may be the move of the vehicle in the future. That is, sensing the move of the vehicle may indicate the case in which the vehicle has moved from one section into another or the case in which the vehicle will move from one section into another.

When it is determined in the determination unit 202 that the first speed limit is larger than the second speed limit, the control unit 201 performs the switch from the control for causing the display unit 30 to generate the first predetermined image and causing the first predetermined image to be displayed on the display medium to the control for causing the display unit 30 to generate a second predetermined image representing the image that indicates the second speed limit when displayed on the display medium, and causing the second predetermined image to be displayed on the display medium by the first switching method. The timing of the switch mentioned herein may be a moment at which the vehicle moves from the first section into the second section or may be a moment before or after a lapse of predetermined time.

Further, when it is determined in the determination unit 202 that the first speed limit is smaller than the second speed limit, the control unit 201 performs the switch from the control for causing the display unit 30 to generate the first predetermined image and causing the first predetermined image to be displayed on the display medium to the control for causing the display unit 30 to generate the second predetermined image by the second switching method different from the first switching method.

The present embodiment described above may offer advantages similar to the advantages of embodiment 1.

In the present embodiment, the above-described variations of embodiment 1 may be combined and applied as desired.

The functions of each constituent of the display system 1 and the display control device 20 described above may be implemented by a computer program.

Figure 14:
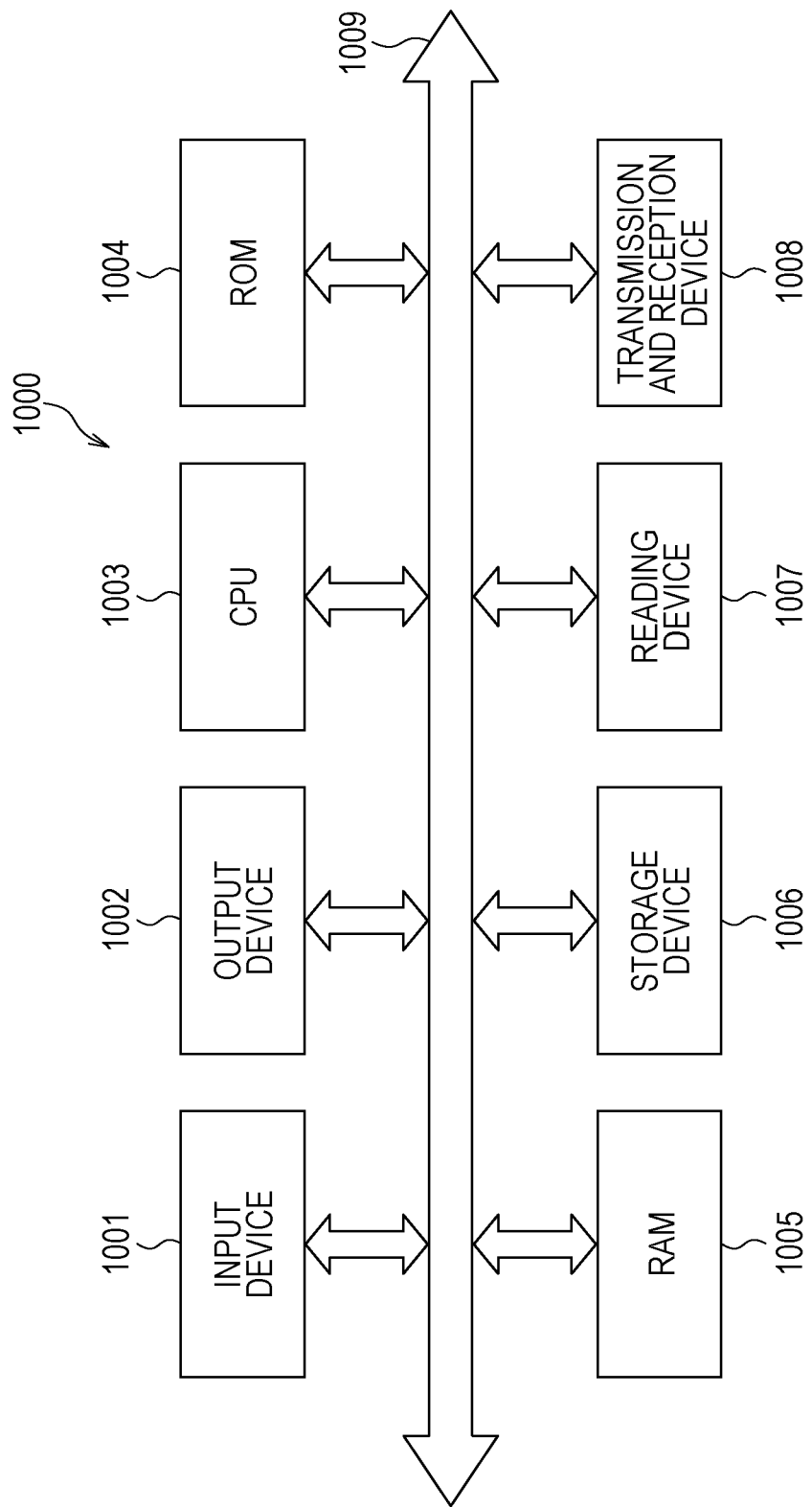
FIG. 14 is a block diagram that illustrates a hardware configuration example of the display system and the display control device according to embodiment 1 or 2 of the present disclosure.

FIG. 14 is a diagram that illustrates a hardware configuration of a computer 1000, which implements the functions of each constituent using a program. The computer 1000 includes an input device 1001, which is for example an input button or a touch pad, an output device 1002, which is for example a display or a speaker, a storage device 1006, which is for example a central processing unit (CPU) 1003, read-only memory (ROM) 1004, random access memory (RAM) 1005, a hard disk device, or a solid-state drive (SSD), a reading device 1007 that reads information from a recording medium, which is for example a digital versatile disc read-only memory (DVD-ROM) or universal serial bus (USB) memory, and a transmission and reception device 1008 that performs communication via a network, and these constituents are connected through a bus 1009.

The reading device 1007 reads a program for implementing the above-described functions of each of the above-described constituents from the recording medium where the program is recorded, and causes the program to be stored in the storage device 1006. As another example, the transmission and reception device 1008 communicates with a server apparatus connected to the network and causes a program for implementing the functions of each of the above-described constituents, which has been downloaded from the server apparatus, to be stored in the storage device 1006.

After that, the CPU 1003 copies the program stored in the storage device 1006 to the RAM 1005, and the functions of each of the above-described constituents are implemented by sequentially reading commands included in the program from the RAM 1005 and executing the commands. In executing the program, the information obtained through each kind of the processes described in each of the embodiments is stored in the RAM 1005 or the storage device 1006.

The present disclosure is useful for a display control device, a display control method, a display control program, and a projection device, which control information provided to a user, which is for example an occupant of a vehicle or the like, or a user who wears a display device.

What is claimed is:

1. A display control device comprising:
an input unit that receives speed limit information being information on a speed limit of a road; and
a controller that controls based on the speed limit information, a display generating a predetermined image and outputting the predetermined image to a display medium, the predetermined image representing a presentation image that indicates the speed limit when displayed on the display medium, wherein
the controller
causes the display to generate a first predetermined image representing a first presentation image that indicates a first speed limit,
recognizes change from the first speed limit to a second speed limit different from the first speed limit according to the received speed limit information,
after recognizing the change in the speed limit, causes the display to generate a second predetermined image representing a second presentation image that indicates the second speed limit and to switch display on the display medium from the first presentation image to the second presentation image, and
when the recognized change in the speed limit indicates decrease, causes the display on the display medium to be switched by a first switching method, and when the recognized change in the speed limit indicates increase, causes the display on the display medium to be switched by a second switching method different from the first switching method.

2. The display control device according to claim 1, wherein
the first switching method is a method to cause the display to display the second presentation image onto the display medium after a lapse of first time after causing the display to stop the display of the first presentation image on the display medium,
the second switching method is a method to cause the display to display the second presentation image onto the display medium after a lapse of second time after causing the display to stop the display of the first presentation image on the display medium, and
the second time is equal to or more than zero and less than the first time.

3. The display control device according to claim 1, wherein
the first switching method is a method in which the display causes the second presentation image to be displayed on the display medium by generating the second predetermined image of a second luminance different from a first luminance after stopping the display of the first presentation image on the display medium by stopping generating the first predetermined image of the first luminance,
the second switching method is a method in which the display causes the second presentation image to be displayed on the display medium by generating the second predetermined image of a third luminance different from the second luminance after stopping the display of the first presentation image on the display medium by stopping generating the first predetermined image of the first luminance, and
a difference between the first luminance and the second luminance is larger than a difference between the first luminance and the third luminance.

4. The display control device according to claim 3, wherein
the first luminance and the third luminance are equal to each other.

5. The display control device according to claim 1, wherein
the first switching method is a method in which the display causes the second presentation image to be displayed on the display medium by generating the second predetermined image so that a luminance gradually increases to a second luminance larger than a first luminance during third time after stopping the display of the first presentation image on the display medium by stopping generating the first predetermined image of the first luminance,
the second switching method is a method in which the display causes the second presentation image to be displayed on the display medium by generating the second predetermined image so that the luminance gradually increases to the second luminance during fourth time after stopping the display of the first presentation image on the display medium by stopping generating the first predetermined image of the first luminance, and
the fourth time is longer than the third time.

6. The display control device according to claim 1, wherein
the first switching method is a method in which the display causes the second presentation image to be displayed on the display medium by generating the second predetermined image so that a luminance gradually increases to a first luminance during fifth time after stopping the display of the first presentation image on the display medium by stopping generating the first predetermined image of the first luminance,
the second switching method is a method in which the display causes the second presentation image to be displayed on the display medium by generating the second predetermined image so that the luminance gradually increases to the first luminance during sixth time after stopping the display of the first presentation image on the display medium by stopping generating the first predetermined image of the first luminance, and
the fifth time is predetermined time that exceeds 20 milliseconds and the sixth time is longer than the fifth time.

7. The display control device according to claim 1, wherein
the first switching method is a method in which the second presentation image is displayed on the display medium by generating the second predetermined image of a first luminance after gradually decreasing a luminance of the first predetermined image to a predetermined luminance less than the first luminance during seventh time in stopping the display of the first presentation image on the display medium by stopping generating the first predetermined image of the first luminance,
the second switching method is a method in which the second presentation image is displayed on the display medium by generating the second predetermined image of the first luminance after gradually decreasing the luminance of the first predetermined image to the predetermined luminance less than the first luminance during eighth time in stopping the display of the first presentation image on the display medium by stopping generating the first predetermined image of the first luminance, and
the seventh time is predetermined time that exceeds 20 milliseconds and the eighth time is longer than the seventh time.

8. A display control device comprising:
an input unit that receives speed limit information and location information of a vehicle, the speed limit information being information on a speed limit of a section of a road; and
a controller that controls based on the speed limit information, a display generating a predetermined image and outputting the predetermined image to a display medium, the predetermined image representing a presentation image that indicates the speed limit when displayed on the display medium, wherein
the controller
when presence of the vehicle in a first section of the road is recognized according to the location information of the vehicle, causes the display to generate a first predetermined image representing a first presentation image that indicates a first speed limit of the first section,
when move of the vehicle from the first section into a second section is recognized according to the location information of the vehicle, recognizes change in the speed limit from the first speed limit to a second speed limit different from the first speed limit according to the speed limit information,
causes the display to generate a second predetermined image representing a second presentation image that indicates the second speed limit and to switch display on the display medium from the first presentation image to the second presentation image, and
when the recognized change in the speed limit indicates decrease, causes switch from the first presentation image to the second presentation image to be performed by a first switching method, and when the recognized change in the speed limit indicates increase, causes the switch from the first presentation image to the second presentation image to be performed by a second switching method different from the first switching method.

9. The display control device according to claim 8, wherein
the switch by the first switching method and the switch by the second switching method are performed when the vehicle moves from the first section into the second section.

10. The display control device according to claim 8, wherein
the switch by the first switching method and the switch by the second switching method are performed after a lapse of predetermined time after the move of the vehicle from the first section into the second section.

11. A projection device comprising:
an input unit that receives speed limit information being information on a speed limit of a road where a vehicle travels;
a display that generates a predetermined image based on the speed limit information and outputs the predetermined image to a display medium, the predetermined image representing a presentation image that indicates the speed limit when displayed on the display medium; and
a controller that controls the display, wherein
the controller
causes the display to generate a first predetermined image representing a first presentation image that indicates a first speed limit,
recognizes change in the speed limit of the road where the vehicle travels from the first speed limit to a second speed limit according to the received speed limit information,
after recognizing the change in the speed limit, causes the display to generate a second predetermined image as the predetermined image representing a second presentation image that indicates the second speed limit and to switch display on the display medium from the first presentation image to the second presentation image, and
when the recognized change in the speed limit indicates decrease, causes the display on the display medium to be switched by a first switching method, and when the recognized change in the speed limit indicates increase, causes the display on the display medium to be switched by a second switching method different from the first switching method.

12. A display control method of a display control device in a display system including an acquisition unit that acquires speed limit information being information on a speed limit of a road where a vehicle travels, and a display that generates a predetermined image representing a presentation image indicating the speed limit when displayed on a display medium and being based on the speed limit information and outputs the predetermined image to the display medium, the predetermined image representing a presentation image that indicates the speed limit when displayed on the display medium, the display control method comprising:
causing the display to generate a first predetermined image representing a first presentation image that indicates a first speed limit;
recognizing change in the speed limit of the road where the vehicle travels from the first speed limit to a second speed limit different from the first speed limit;
after recognizing the change in the speed limit, causing the display to generate a second predetermined image representing a second presentation image that indicates the second speed limit and to switch display on the display medium from the first presentation image to the second presentation image; and
when the recognized change in the speed limit indicates decrease, causing the display on the display medium to be switched by a first switching method, and when the recognized change in the speed limit indicates increase, causing the display on the display medium to be switched by a second switching method different from the first switching method.

13. A computer-readable non-transitory recording medium storing a display control program, wherein the display control program causes a computer to execute processes of:
causing the display to generate a first predetermined image as the predetermined image representing a first presentation image that indicates a first speed limit;
recognizing change in the speed limit of the road where the vehicle travels from the first speed limit to a second speed limit different from the first speed limit;
after recognizing the change in the speed limit, causing the display to generate a second predetermined image as the predetermined image representing a second presentation image that indicates the second speed limit and to switch display on the display medium from the first presentation image to the second presentation image; and
when the recognized change in the speed limit indicates decrease, causing the display on the display medium to be switched by a first switching method, and when the recognized change in the speed limit indicates increase, causing the display on the display medium to be switched by a second switching method different from the first switching method.

* * * * *